United States Patent [19]

Hunt, Jr. et al.

[11] Patent Number: 5,221,377

[45] Date of Patent: * Jun. 22, 1993

[54] ALUMINUM ALLOY PRODUCT HAVING IMPROVED COMBINATIONS OF PROPERTIES

[75] Inventors: Warren H. Hunt, Jr., Monroeville; James T. Staley; David A. Lukasak, both of Murrysville; David B. Reiser, Allentown; Rebecca K. Wyss, Plum Boro; Lynette M. Angers, Monroeville, all of Pa.

[73] Assignee: Aluminum Company of America, Pittsburgh, Pa.

[*] Notice: The portion of the term of this patent subsequent to Sep. 5, 2006 has been disclaimed.

[21] Appl. No.: 702,655

[22] Filed: May 17, 1991

Related U.S. Application Data

[63] Continuation-in-part of Ser. No. 297,676, Jan. 13, 1989, abandoned, which is a continuation-in-part of Ser. No. 99,445, Sep. 21, 1987, Pat. No. 4,863,528.

[51] Int. Cl.$^5$ .................................. C22C 21/06
[52] U.S. Cl. ..................... 148/417; 148/698; 148/701; 148/418; 148/439; 420/532
[58] Field of Search ............ 148/2, 3, 11.5 A, 12.7 A, 148/415, 416, 417, 418, 437–440, 698, 701; 420/532

[56] References Cited

U.S. PATENT DOCUMENTS 4,863,528 9/1989 Brown et al. ............... 148/12.7 A

FOREIGN PATENT DOCUMENTS 346369 7/1972 U.S.S.R. .

Primary Examiner—R. Dean
Assistant Examiner—Robert R. Koehler
Attorney, Agent, or Firm—Carl R. Lippert; Cary P. Topolosky

[57] ABSTRACT

An alloy product having improved combinations of strength, density, toughness and corrosion resistance, said alloy product consisting essentially of about 7.6 to 8.4% zinc, about 1.8 to 2.2% magnesium, about 2 to 2.6% copper and at least one element selected from zirconium, vanadium and hafnium present in a total amount not exceeding about 0.5%, preferably about 0.05 to 0.25% zirconium, the balance aluminum and incidential elements and impurities. The alloy product, suitable for aerospace applications, exhibits high yield strength, at least about 10% greater yield strength than its 7X50-T6 counterpart, with good toughness and corrosion resistance properties typically comparable to or better than those of its 7X50-T76 counterpart. Upper wing members made from this alloy typically have a yield strength over 84 ksi, good fracture toughness and an EXCO exfoliation resistance level of "EC" or better, typically "EB".

167 Claims, 3 Drawing Sheets

ALUMINUM ALLOY PRODUCT HAVING IMPROVED COMBINATIONS OF PROPERTIES

CROSS-REFERENCE TO RELATED APPLICATION

This is a continuation-in-part of U.S. application Ser. No. 297,676, filed Jan. 13, 1989, now abandoned, which, in turn, was a continuation-in-part of U.S. application Ser. No 099,445, filed on Sep. 21, 1987, now U.S. Pat. No. 4,863,528, issued Sep. 5, 1989, the disclosures of both being fully incorporated by reference herein.

BACKGROUND OF THE INVENTION

The present invention relates to an aluminum alloy product having improved combinations of strength, toughness and corrosion resistance. This invention further relates to an aluminum-zinc-magnesium-copper alloy having at least about 10% greater yield strength than 7X50-T6 aluminum, the strongest aluminum alloy currently in wide use for demanding aerospace applications such as upper wing members, with toughness and corrosion properties comparable or superior to those of 7X50-T6 aluminum.

Precipitation-hardened 7075 alloy products exhibit high strength values in the T6 temper. Aluminum alloys, 7050 and 7150, exhibit still higher strengths in T6-type tempers. Should 7075 and 7X50 alloy products be artificially aged to a T76, T74 or T73-type temper, their resistances to stress corrosion cracking and/or exfoliation corrosion improve, in the order stated (with T73 being best), but often at some cost to strength vis-a-vis the T6 condition. The overall performance levels of 7X50 alloys greatly exceed those of 7075 aluminum, or other 7XXX alloys currently in wide aerospace use.

Another T7-type designation was recently registered for the aforementioned 7XXX alloys, that being T77 tempering which attains strength levels at or near strength levels associated with T6 temper in combination with T76, or even T74, corrosion resistance properties. Means for aging to this temper are set forth in U.S. Pat. No. 4,477,292 and British Patent No 1,480,351, the disclosures of which are fully incorporated by reference herein.

SUMMARY OF THE INVENTION

A principal object of this invention is to provide aluminum alloy products having very high strength and specific strength (strength divided by density) values, substantially exceeding those of 7X50, while substantially maintaining or even improving the toughness and corrosion resistance properties of the previous products. Another object is to provide an improved Al-Zn-Mg-Cu alloy product having EXCO corrosion resistance levels of "EB" or better with at least about 15% greater yield strength than a similarly-sized 7X50 counterpart in the T76 condition, at least about 10% greater yield strength than a 7X50-T6 counterpart, or at least about 5% greater strength than its 7X50-T77 counterpart. When the improved alloy products of this invention are artificially aged to produce exfoliation corrosion resistance properties of "EC" or better (EXCO levels comparable to those of 7X50-T6 products), the invention alloy will typically possess at least about 20% greater strength than its 7X50-T76 counterpart, at least about 15% greater strength than its 7X50-T6 counterpart and at least about 9% greater yield strength than a 7X50-T77 alloy counterpart product. It is another object to provide aerospace structural members, such as upper wing skin plates, extrusions or the like, from this improved high strength alloy.

These and other objects of the invention are achieved by an alloy consisting essentially of about 7.6 to 8.4% zinc, about 1.8 to 2.3% magnesium, about 2 to 2.6% copper, and at least one element selected from zirconium, vanadium and hafnium present in an amount up to about 0.2% or 0.3% for zirconium and vanadium, or about 0.4% or 0.5% for hafnium, the balance aluminum and incidental elements and impurities. The alloy may be benefited in some cases with up to about 0.3 or 0.4% manganese. As used herein, all compositional limits are by weight percent unless otherwise indicated.

The improved alloy products of this invention exhibit substantially greater combinations of yield strength, fracture toughness and corrosion resistance as shown in the accompanying Figures. Because these preferred ranges of elements do not excessively increase alloy density relative to 7X50 aluminum, significant increases in specific strength are also realized by the invention. One preferred method for artificially aging this alloy composition includes: (after solution heat treating) heating to one or more temperatures within about 175° to 325° F. for 2 or more hours; heating for a cumulative time-temperature effect substantially within ABCD of accompanying FIG. 1; and heating to one or more temperatures within about 175° to 325° F. for 3 or more hours. Another set of improved properties, with only slightly lower strengths, is imparted by subjecting this alloy composition to: solution heat treatment; heating to one or more temperatures within about 175° to 275° F. for about 2 or more hours; and heating within about 300° to 345° F. for an additional 2 or more hours.

BRIEF DESCRIPTION OF THE DRAWINGS

Further features, other objects and advantages of this invention will become clearer from the following detailed description made with reference to the drawings in which.

DETAILED DESCRIPTION OF THE PREFERRED EMBODIMENTS

Figure 1:
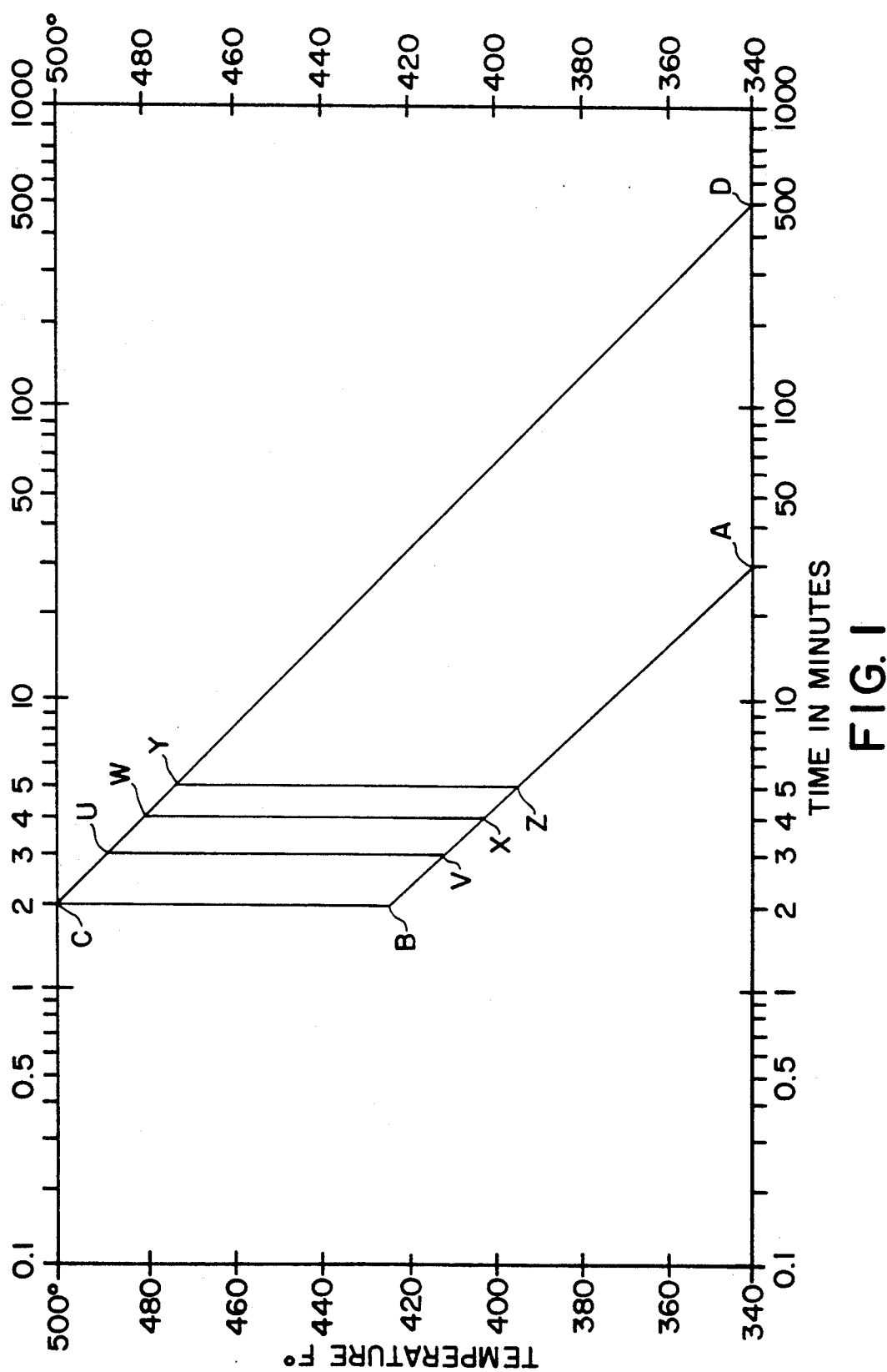
FIG. 1 is a graph showing preferred time-temperature treatments for imparting improved corrosion resistance to one embodiment of the invention.

As used throughout this description of the invention, the following definitions shall apply:

a. The term "ksi" shall mean kilopounds per square inch.
b. The term "minimum strength" shall mean the strength level at which 99% of the product is expected to conform with 95% confidence using standard statistical methods.
c. The term "ingot-derived" shall mean solidified from liquid metal by known or subsequently developed casting processes rather than through powder metallurgy or similar techniques. The term expressly includes, but shall not be limited to, direct chill (DC) continuous casting, electromagnetic continuous (EMC) casting and variations thereof.

d. The term "7XXX" or "7000 Series", when referring to alloys, shall mean structural aluminum alloys containing zinc as their main alloying element, or the ingredient present in largest quantity.

e. The term "counterpart", when used to compare products made from different 7XXX alloys, shall mean a part or product, e.g. an extrusion, of generally similar section thickness or manufacturing history, or both.

f. The term "7X50" shall mean any alloy currently or subsequently registered in this family or subgroup of 7XXX alloys. The term expressly includes, but shall not be limited to, 7050 aluminum and substantially identical 7150 aluminum.

For every numerical range set forth, it should be noted that all numbers within the range, including every fraction or decimal between its stated minimum and maximum, are considered to be designated and disclosed by this description. As such, herein disclosing a preferred elemental range of about 7.6 to 8.4% zinc expressly discloses zinc contents of 7.7, 7.8, 7.9% ... and so on, up to about 8.4% zinc. Similarly, herein disclosing artificial aging to one or more temperatures between about 300° and 345° F. discloses thermal treatments at 301°, 302° F., ... 315°, 316° F., ... and so on, up to the stated maximum.

For most currently used 7000 Series (or 7XXX) alloys, T6-type tempers are obtained by precipitation hardening within about 175° to 325° or 350° F. Plate and extrusion products of 7075 aluminum, for example, are typically T6-aged by heating for about 24 hours at 250° F. in a circulatory-air furnace. Products of 7X50 aluminum, on the other hand, are first treated at 250° F., followed by a higher temperature treatment, within about 325° to 350° F., to obtain (T6) strength.

An alternative method for thermally treating 7075 aluminum and other 7XXX alloys is set forth in British Patent No 1,480,351, referred to hereinabove. According to this method, improved combinations of strength and corrosion resistance are imparted from a multistage, or "low-high-low", temperature treatment which includes solution heat treating, precipitation hardening at about 175° to 325° F., further aging by subjecting to a temperature within about 360° to 450° F. for a cumulative time-temperature treatment as described therein, then again precipitation hardening for about 2 to 30 hours between about 175° to 325° F.

Related patent application Ser. No. 07/099,445, filed on Sep. 21, 1987, now U.S. Pat. No. 4,863,528, discloses that still higher yield strengths are attained when 7XXX alloy products having a total zinc content ranging from about 6 or 8% to about 16% were subjected to low-high-low aging conditions generally similar to those described directly above. Although 7XXX alloys containing relatively higher amounts of zinc (e.g. 8 to 10% or more) have been known to exhibit significantly greater strengths than 7075 aluminum for some time, they were considered commercially impractical because they were much more susceptible to exfoliation and stress corrosion cracking. In earlier versions of such high zinc-aluminum alloys, strength improvements usually were accompanied by unacceptable toughness reductions as well.

By way of this invention, it has been determined that a particular range of elements exhibits substantially better combinations of specific strength, fracture toughness and exfoliation corrosion resistance. Improved 7XXX alloy products containing about 7.6 to about 8.4% zinc, about 1.8 to about 2.3% magnesium and about 2 to about 2.6% copper possess significantly greater levels of strength than their 7X50 counterparts while maintaining, or even slightly improving their toughness and/or corrosion resistance performances, particularly when thermally treated by one of two preferred methods. For greater toughness values, the amount of magnesium in the invention alloy is preferably kept at or below about 2 or 2.1%. For better resistance to exfoliation and stress corrosion cracking, copper contents should be maintained higher, preferably above about 2.2%, while better combinations of strength and density (or specific strength) are achieved with relatively lower zinc contents, below about 8.1%. In any event, the total amount of zinc, magnesium and copper present should not substantially or excessively exceed a dissolvable amount, by which it is meant an amount that can be brought substantially into solid solution during solution heat treatment (SHT) so that fewer than one volume percent of undissolved intermetallic phases (about 1 micron in size or larger and containing Zn, Cu and/or Mg) remains after solution heat treatment. On a more preferred basis, less than one-half volume percent (0.5%) of such undissolved phases should remain after SHT. It is therefore advantageous to limit combined zinc, magnesium and copper contents to between about 11.9 or 12.1% and about 12.5 or 12.7% or 12.9%. The invention alloy preferably should also maintain a total zinc-copper (Zn+Cu) content between about 9.9 and 10.6% or 10.7%.

Alloy products of this invention should further include at least one element selected from zirconium between about 0.03 and 0.2 or 0.3%, for instance 0.05 to 0.15% or 0.2% or 0.25% zirconium; vanadium between about 0.05 and 0.2 or 0.3%, for instance 0.05 to 0.15% vanadium; and hafnium between about 0.03 and 0.4 or 0.5%, for instance 0.05 to 0.35% hafnium. The alloy can also contain some manganese, suitably between about 0.07 or 0.1% to about 0.3 or 0.35%. The total content of Zr, V, Hf and Mn should not exceed about 0.5 or 0.6 or 0.7% and preferably the total amount does not exceed that amount which may substantially be maintained in a supersaturated state following alloy solidification. It is believed that such elements, or combinations of elements, enhance alloy performance such as by suppressing recrystallization to some extent, especially in cases where the alloy is subjected to cold work or equivalent cold work prior to solution heat treatment. Relatively high amounts of Zr within the aforesaid ranges, for instance 0.15 to 0.25 or even 0.3% are believed to have benefit or potential benefit by reducing recrystallization in products whose production process might otherwise encourage or increase recrystallization tendency. Unlike some earlier high zinc-aluminum alloys that included nickel, cadmium or chromium, it is neither necessary nor advantageous or sufficient for the invention alloy composition to include any nickel, calcium or chromium. Rather, the 7XXX products exhibiting greater combinations of properties hereunder are substantially nickel-free, calcium-free and chromium-free. By use of the term "substantially free" above, it is meant that preferably no quantity of such elements is present, it being understood, however, that alloying materials, operating conditions and equipment are not always ideal such that minor amounts of undesirable contaminants or non-added elements may find their way into the invention alloy. In any event, it should be understood that the nickel content of the invention alloy are maintained below about 0.04 or 0.05%, or more preferably below a maximum of about 0.01 or 0.02% nickel; the calcium content should be kept below about 0.015 or 0.02%, more preferably below about 0.01 or 0.005% maximum; and the chromium level should be less than about 0.08%, or more preferably below a maximum of about 0.04 or 0.05% chromium.

It is another surprising feature that the invention alloy possesses less need to maintain its iron and silicon contents at an extremely low level. It is generally believed that Fe and Si are both harmful to toughness, but the measured fracture toughnesses for alloy products containing about 0.05% iron and about 0.05% silicon were similar to those values for alloys containing about 0.15% each of these impurities, both toughness levels resembling that of a 7XXX product possessing lower strength, namely 7150-T6 aluminum. Conventional metallurgical wisdom predicts that toughness properties should decrease with increasing strength unless iron and silicon contents are purposefully lowered. The invention alloy was found to offer surprisingly less sensitivity to variations in the tolerable amounts of these two impurities at levels below 0.15%, however. Although total iron plus silicon contents of about 0.2 or 0.25% maximum are preferred, it is also possible for the invention alloy to accommodate cumulative iron plus silicon concentrations up to about 0.4 or 0.5%. Thus, the invention alloy can contain about 0.04 or 0.05 or 0.06% up to 0.15 or even 0.2 or 0.25% or 0.3% each of iron and silicon. However, a maximum of 0.1% or 0.15% or possibly 0.2% is preferred for each of iron and silicon. Elements other than those named hereinabove are preferably limited to 0.1 or 0.2% or possibly 0.3% maximum, more preferably 0.05% maximum. The combined total of other elements not named hereinabove is preferably not over 0.5 or 1%, more preferably not over about 0.1 or 0.2%.

Because of the combinations of properties attainable, the invention alloy is especially well suited for critical aerospace applications, such as wing upper skin panels or members (typically plate), and other high strength end uses. Products may be directly cast or formed into useful shapes from this alloy by any known or subsequently developed technique including rolling, forging and extrusion. The resulting sheet, plate, rod, bar or the like, may vary greatly in size and shape. For most aerospace applications, plate products made from this preferred composition may have cross-sectional thicknesses ranging from about 0.3 or 0.35 inch, up to about 1.5, 2 or even 3 or more inches. It should be further understood, however, that the invention alloy may also be made into products having cross-sectional thicknesses even smaller than about 0.3 inch.

The alloy products of this invention are typically ingot-derived and exhibit internal structure features characteristic of ingot derivation. Once an ingot has been cast from this composition, it is homogenized by heating to one or more temperatures between about 860° and 920° F. after which it is worked (and sometimes machined) into a desired shape. The product, if desired, should then be solution heat treated by heating to one or more temperatures between about 840° or 850° F. and about 880° or 900° F. to take substantial portions, preferably all or substantially all, of the soluble zinc, magnesium and copper into solution, it being again understood that with physical processes which are not always perfect, probably every last vestige of these main alloying ingredients will not be dissolved during SHT (solutionizing). After heating to elevated temperatures as just described, the product should be rapidly cooled or quenched to complete the solution heat treating procedure. Such cooling is typically accomplished by immersion in a suitably sized tank of cold water, though water sprays and/or air chilling may be used as supplementary or substitute cooling means. After quenching, certain products may need to be cold worked, such as by stretching, so as to relieve internal stresses. A solution heat treated (and quenched) product, with or without cold working, is then considered to be in a precipitation-hardenable condition, or ready for artificial aging according to one of two preferred methods. As used hereinafter, the term "solution heat treat" shall be meant to include quenching unless expressly stated otherwise.

In the first preferred thermal aging treatment, precipitation-hardenable alloy product is subjected to three main aging steps, phases or treatments, although clear lines of demarcation may not exist between each step or phase. It is generally known that ramping up to and/or down from given (or target) treatment temperatures, in itself, can produce precipitation (aging) effects which can, and often need to be, taken into account by integrating such ramping conditions, and their precipitation-hardening effects, into the total aging treatment program. Such integration was described in greater detail in U.S. Pat. No. 3,645,804, the disclosure of which is fully incorporated by reference herein. With ramping and its corresponding integration, the three phases for thermally treating invention alloy according to this aging practice may be effected in a single, programmable furnace. For convenience purposes, though, each stage (step or phase) will be more fully described as a distinct operation hereafter. It is believed that the first stage serves to precipitation harden the alloy product; the second (higher temperature) stage then exposes alloy product to one or more elevated temperatures for increasing its resistance to exfoliation and stress corrosion cracking (SCC); while the third stage further precipitation hardens the invention alloy to a very high strength level.

In the first treatment stage summarized above, invention alloy is precipitation hardened to strengthen it, for example, it can be carried to a point at or near peak strength (whether underaged or slightly overaged) although less than peak strength conditions (or underaging) may be desired in some cases. Such precipitation hardening can be accomplished by heating to one or more elevated temperatures below about 330° F., preferably between about 175° and 325° F., for a significant period of time ranging from about 2 or 3 hours to about 30 hours or more. A substantially similar treatment may occur through gradual ramping to the second (higher temperature) treatment stage, with or without any hold time at temperature(s) in said first range. Such precipitation hardening significantly strengthens the alloy over the strength level which it achieves promptly after quenching (hereinafter, "as-quenched" or "solution heat treated" strength). Such precipitation hardening improves strengths by at least 30%, and preferably by at least 40 to 50% or more, for example, about 60 or 70%, of the difference between as-quenched and peak yield strength, or of the difference between as-quenched strength and the strength of the product at the completion of artificial aging. In other words, the precipitation hardening of alloy product entering the second treatment (or phase) should have carried (or increased) the alloy product's yield strength by at least about 30%, and preferably more, of the way from as-quenched or solution heat treated strength (i.e., low strength) toward its eventual strength after aging is completed. This first treatment phase can also extend until the alloy achieves up to about 95% of peak strength in the aging process involved (underaged), peak strength itself, or even until alloy strength runs slightly past peak and back down to about 95% of peak strength (through overaging). It should be understood, however, that for some embodiments, strength may also increase during the second treatment phase depending on the extent to which the first treatment phase strengthened the alloy.

Following this first phase of thermal treatment, the invention alloy is preferably subjected to heating at one or more elevated temperatures above the temperatures in the earlier stage, typically above about 340° F. or 350° F., preferably within the range of about 360° to 400° or possibly 450° or 500° F., for a few minutes or preferably more (e.g., for 3 or more minutes, preferably more than three minutes, at least about 4 or 5 minutes or more). Typical second phase treatments include subjecting the alloy product to cumulative times and temperatures within the perimeter ABCD of FIG. 1, even though one, or more than one, temperature within ABCD may be employed for such treatment. Lower temperatures than 340° F., for instance 315° or 320°, may also be useful in this treatment. As is apparent from FIG. 1, there is a correlation between time and temperature for this preferred second treatment. Generally, alloy exposure temperatures vary inversely with duration such that shorter times are used at relatively higher temperatures, while longer times are more appropriate at the lower temperatures, below about 400° F. or so. Illustrative second phase treatments proceed for 3 or more minutes between about 360° and 490° F.; for 4 or more minutes between about 360° and 480° F.; or for 5 or more minutes between about 360° and 475° F. The 3-, 4-, and 5-minute minimum thresholds of ABCD in FIG. 1 are shown by lines U-V, W-X and Y-Z, respectively. In general, for a particular substantially isothermal temperature treatment, a preferred time is generally around midway between lines AB and CD in FIG. 1 for that temperature, give or take some allowance for individual circumstances.

When heating alloy products to one or more temperatures for "x" minutes according to this preferred second treatment phase, it is to be understood that such treatment embraces heating to any number of temperatures within said range for a cumulative time "x" above the lowest temperature of said range. As such, heating for 5 or more minutes within about 360° to 475° F. does not require holding for 5 minutes at each or even any particular temperature within said range, but rather, that the cumulative time at all temperatures within 360° to 475° F. is 5 minutes or more.

It is generally believed that the foregoing second treatment phase improves this alloy's resistance to stress corrosion cracking (SCC), exfoliation and other detrimental corrosion effects. With respect to FIG. 1, better properties of SCC resistance are believed achievable when heating for time-temperature effects closer to line C-D, while greater combinations of strength and exfoliation resistance are attainable when aging at conditions closer to line A-B of FIG. 1. Second phase treatmentd may be carried out by immersing alloy products into a substantially hot liquid such as molten salt, hot oil or even molten metal. A furnace (hot air and/or other gases) may also be used depending on the size, shape and quantity of product to be treated. In the alternative, a fluidized bed-type apparatus may be used, said apparatus providing more rapid heating than a hot air furnace but slower, more uniform heating than a molten salt bath. Fluidized bed heat-ups can be especially advantageous for presenting fewer environmental complications. Induction heaters may also be used for artificial aging according to the invention, for instance, in the second phase of this preferred method.

During the third phase of this preferred treatment method, alloy product is precipitation-hardened at one or more elevated temperatures up to about 330° F., typically between about 175° and 325° F., for about 2 to 30 hours or more.

With such treatment, the invention alloy is able to achieve significantly higher strength levels than those attained by 7075 aluminum and other 7XXX counterparts. When aged to achieve corrosion properties comparable to those of prior T76-aged products, for example, having EXCO corrosion ratings of "EB" or better, the invention alloy produces minimum or guaranteeable yield strengths (compression and/or tension) at least about 15% greater than the minimum strengths for a similarly-sized, shaped and formed 7X50 alloy product aged to a T76 temper (or 7050-T76); and at least about 10% greater strength than a 7X50-T6 product. Minimum strengths for typical 7150-T6 products are listed in following Table 1, it being recalled that 7150-T6 is currently the strongest aluminum alloy commercially used by the aerospace industry in upper wing skins and other high strength applications. By "minimum" strength is meant the strength level required to satisfy an industry specification for such product. For instance, referring to 7150-T651 in Table 1, the specification requires a yield strength of 78 ksi or more. Improved alloy products of this invention exhibit about 5% or 10% greater minimum strengths than a 7X50-T77 product, at EC levels of exfoliation resistance or better.

When the improved alloy products of this invention are thermally treated to achieve slightly lower minimum EXCO ratings of "EC" or better, their strengths exceed those of 7X50-T76 products (having "EB" EXCO levels or better) by at least about 20%; exceed those of 7X50-T6 products (with "EC" EXCO values or lower) by about 15% or more; and exceed those minimum strengths associated with 7X50-T77 aged products by about 9% or more. For the preceding percent-improvement calculations, minimum yield strengths of existing commercial alloy tempers were used rather than actual or typical strength values (which generally run higher) since minimum strengths are usually employed for design considerations. Should actual (or typical) strengths of existing tempers be compared, the invention alloy is expected to still exhibit the same level of strength improvement, about 5–20% or more, over its 7X50-T6, -T76 or -T77 counterparts.

TABLE 1

| Minimum Yield Strength Levels in Tension (ksi) | | |
|---|---|---|
| Plate: 7150-T651 | | |
| Thickness (in.) | Longitudinal (L) Strength | Long Transverse (LT) Strength |
| 0.500–0.749 | 78 | 77 |
| 0.750–1.000 | 78 | 78 |
| 1.001–1.500 | 78 | 77 |
| Extrusion: | | |

TABLE 1-continued

| Minimum Yield Strength Levels in Tension (ksi) | |
|---|---|
| Thickness (in.) | Longitudinal (L) Strength |
| 7150-T651X Registered by Boeing | |
| 0.250-0.499 | 78 |
| 0.500-0.749 | 78 |
| 0.750-2.000 | 78 |
| 7150-T6151X Alcoa | |
| 0.250-0.499 | 82 |
| 0.500-0.749 | 83 |
| 0.750-2.000 | 84 |

Strength values for artificially aged alloy products of the invention will vary to some extent depending on their size, shape and method of manufacture. For example, improved plate products should consistently achieve minimum strengths of about 82 to 85 ksi or more with differing cross-sectional thicknesses. Improved extrusions, on the other hand, should attain minimum yield strengths of about 86 to 90 ksi without suffering from excessive exfoliation corrosion.

The alloy products of this invention achieve high strengths while having imparted thereto corrosion resistance properties which typically exceed those associated with 7X50-T6 products. In most cases, the invention alloy exhibits exfoliation corrosion resistance which meets or exceeds those of T76-aged 7XXX alloy products. When such products are thermally treated by the three-stages (or phases) described above, they possess an ability to survive 20 days or more of alternate immersion testing in a 3.5% NaCl solution without failure while under constant stresses of about 15 ksi. Under other aging conditions, these improved products may withstand alternate immersion testing at constant stresses of about 35 ksi, thereby achieving an SCC resistance level comparable to that of T74-aged products. Exfoliation resistances of the invention alloy are also generally improved over those levels associated with 7X50-T6 aluminum (typically an EXCO rating of "EC").

Table 2 sets forth the standards for resistance to stress corrosion cracking (SCC) and for exfoliation resistance currently required of 7075, 7050 and 7150 products aged to the T73, T74 and T76, along with typical performance for T6, tempers. To determine whether commercial alloys meet the SCC standards, a given test specimen is subjected to one of two preferred SCC tests. The first test, usually conducted on products having short transverse thicknesses greater than about 1.5 inch, subjects short transverse bar specimens, ⅛ inch (3.2 mm) in diameter, to alternate immersion testing in accordance with ASTM Standard G47, including G44-75, the disclosures of which are fully incorporated by reference herein. More specifically, these bar-shaped specimens are exposed to cycles of immersing in a 3.5% NaCl aqueous solution for 10 minutes, followed by 50 minutes of air drying while being pulled from both ends under a constant strain (ksi). Such testing is carried out for a minimum of 20 days (or for less time should the specimen fail or crack before 20 days have passed). The other preferred SCC test conducted in accordance with ASTM Standard G47, including G38-73, the disclosures of which are incorporated by reference, is typically used for extruded alloy products or plate less than 1.5 inch thick. This test consists of compressing the opposite ends of a C-shaped ring using constant strain levels and alternate immersion conditions substantially similar to those set forth above. The exfoliation test used for comparison purposes herein is more commonly known as the EXCO test as performed in accordance with ASTM Standards G34-72 and G34-79, the disclosures of which are also fully incorporated by reference herein.

TABLE 2

| | Corrosion Resistance Standards | |
|---|---|---|
| Temper | SCC Stress Level (ksi) | Exfoliation Requirement EXCO Test |
| T73 | 42 | P - pitting; little or no exfoliation |
| T74 | 35 | EA - slight or superficial exfoliation |
| T76 | 17-25 | EB - moderate - more exfoliation than EA |
| T6 | no standard <7 | No standard - typically EC to ED - more exfoliation than EB |

There exists another method for thermally treating alloy compositions of this invention to achieve slightly lower strength improvements than those achieved with the preferred "low-high-low" aging practice described earlier, but still higher than those strength levels associated with any 7050 and 7150 counterparts. With this second preferred aging practice, the invention alloy produces actual strengths at least about 3 to 5% greater, and as much as 11 to 14% greater, than 7X50-T6 aluminum with typically better toughness and corrosion resistance properties. The steps (or phases) to this second preferred practice, after solution heat treating, include: heating to one or more temperatures within about 175° to 285° F. for about 2 or more hours, or more preferably, for about 6 to 30 hours; and heating to one or more temperatures within about 300° to 345° or 350° F. for about 2 or more hours, or more preferably, for about 5 to 18 hours. When these same conditions are applied to a 7075 or 7X50 product, they will result in T76 corrosion resistances in combination with strength levels below those associated with T6-type aging.

In Table 3, there is provided a general comparison of 7XXX alloys for purposes of illustrating this invention, said alloys having been generally grouped into sets based on the percentage of magnesium present therein. The alloys all contained around 0.1% Zr along with more or less consistent amounts of Fe and Si. Table 3 lists the respective weight percents of zinc, magnesium and copper present in each 7XXX alloy; their combined total of zinc, magnesium and copper contents; the measured density for each alloy; and the respective first and second stage artificial aging conditions employed. The third aging stage was not given a separate column in Table 3 as it was consistently 24 hours at 250° F. for all alloys so listed. Table 3 also lists the tensile yield strength (TYS), specific TYS (TYS/density), compressive yield strength (CYS), and specific CYS (CYS/density) values for each alloy, followed by their respective electrical conductivity values (in terms of % IACS), said conductivity values serving as approximations of alloy corrosion resistance performance. The last columns in Table 3 then list actual EXCO test results for each alloy, and the measured Kr25 toughness values for the same, said toughness measured in accordance with ASTM Standard E561-86, the disclosure of which is fully incorporated by reference herein.

TABLE 3

| Description | Zn (%) | Mg (%) | Cu (%) | Zn + Mg + Cu (%) | Density (lbs/in**3) | 1st Step Age (°F.)/(hr) | 2nd Step Age (°F.)/(hr) | TYS (ksi) |
| --- | --- | --- | --- | --- | --- | --- | --- | --- |
| Invention Alloy | 7.76 | 2.07 | 2.51 | 12.34 | 0.1034 | 250/24 | 360/0.75 | 94.6 |
| | 7.76 | 2.07 | 2.51 | 12.34 | 0.1034 | 250/24 | 360/1.0 | 93 |
| | 7.76 | 2.07 | 2.51 | 12.34 | 0.1034 | 250/24 | 370/0.5 | 95.6 |
| | 7.76 | 2.07 | 2.51 | 12.34 | 0.1034 | 250/24 | 375/0.58 | 92.7 |
| Mg < 2.3% | 8.04 | 1.91 | 1.61 | 11.56 | 0.103 | 250/24 | 375/0.42 | 88.1 |
| | 9.7 | 2.1 | 1.5 | 13.3 | 0.1039 | 250/24 | 375/0.42 | 88.6 |
| | 8.76 | 2.19 | 2.06 | 13.01 | 0.1036 | 250/24 | 375/0.25 | 95.6 |
| | 8.76 | 2.19 | 2.06 | 13.01 | 0.1036 | 250/24 | 375/0.42 | 95.4 |
| | 8.76 | 2.19 | 2.06 | 13.01 | 0.1036 | 250/24 | 375/0.58 | 89.9 |
| | 8.76 | 2.19 | 2.06 | 13.01 | 0.1036 | 250/24 | 375/0.75 | 87 |
| | 10.83 | 2.2 | 1.6 | 14.63 | 0.1047 | 250/24 | 375/0.42 | 92.4 |
| | 10.83 | 2.2 | 1.6 | 14.63 | 0.1047 | 250/24 | 375/0.58 | 88.6 |
| | 10.83 | 2.2 | 1.6 | 14.63 | 0.1047 | 250/6 | 360/0.75 | 91 |
| | 10.83 | 2.2 | 1.6 | 14.63 | 0.1047 | 250/6 | 375/0.42 | 91.6 |
| 7150 | 6.6 | 2.35 | 2.12 | 11.07 | 0.1022 | 250/24 | 375/0.58 | 88.7 |
| | 6.6 | 2.35 | 2.12 | 11.07 | 0.1022 | 250/24 | 375/0.75 | 86.8 |
| 2.3% < Mg < 3.0% | 8.9 | 2.53 | 2 | 13.43 | 0.1035 | 250/24 | 375/0.42 | 100.1 |
| | 8.9 | 2.53 | 2 | 13.43 | 0.1035 | 250/24 | 375/0.58 | 97.4 |
| | 8.9 | 2.53 | 2 | 13.43 | 0.1035 | 250/24 | 375/0.75 | 94.6 |
| | 8.9 | 2.53 | 2 | 13.43 | 0.1035 | 250/24 | 375/0.92 | 93.3 |
| | 8.9 | 2.53 | 2 | 13.43 | 0.1035 | 250/6 | 375/0.42 | 96.7 |
| | 8.9 | 2.53 | 2 | 13.43 | 0.1035 | 250/6 | 375/.58 | 94.2 |
| | 8.9 | 2.53 | 2 | 13.43 | 0.1035 | 250/6 | 378/0.75 | 91.7 |
| Mg > 3.0% | 9.96 | 3 | 2.5 | 15.46 | 0.1044 | 250/24 | 375/0.58 | 93.9 |
| | 8.2 | 3.03 | 1.6 | 12.83 | 0.1025 | 250/24 | 375/0.42 | 94.9 |
| | 10.2 | 3.06 | 1.57 | 14.83 | 0.1038 | 250/24 | 375/0.75 | 91.1 |
| | 11.4 | 3.1 | 1.6 | 16.1 | 0.1046 | 250/24 | 375/0.75 | 91.7 |
| Undissolved Solute | 11.2 | 2.11 | 2.5 | 15.81 | 0.1057 | 250/24 | 375/0.58 | 89.7 |

| Description | Spec. TYS (in**-6) | Comp. YS (ksi) | Spec. CYS (in**-6) | E.C. (% IACS) | EXCO* | Kr25 Toughness (ksi√in) |
| --- | --- | --- | --- | --- | --- | --- |
| Invention Alloy | 0.915 | 94.4 | 0.913 | 36.5 | EA | 84.6 |
| | 0.899 | 92.9 | 0.898 | 37.1 | EB | 89.1 |
| | 0.925 | 96.1 | 0.929 | 36.5 | EA | 79.7 |
| | 0.897 | 93.6 | 0.905 | 37.4 | EA | 95.9 |
| Mg < 2.3% | 0.855 | 86.7 | 0.842 | 37.5 | EB | 90.3 |
| | 0.853 | 87.7 | 0.844 | 37.2 | EB | 85.3 |
| | 0.923 | 98.8 | 0.954 | 35.2 | — | 66.2 |
| | 0.921 | 95.2 | 0.919 | 36.4 | EB | 71.6 |
| | 0.868 | 90.2 | 0.871 | 37.6 | EA | 95.3 |
| | 0.84 | 89.1 | 0.86 | 37.9 | — | 85.7 |
| | 0.883 | 92.8 | 0.886 | 36.3 | EB | 76.6 |
| | 0.846 | 88.2 | 0.842 | 37.5 | EB | 97.3 |
| | 0.869 | 92.8 | 0.886 | 36.8 | EC | 77.2 |
| | 0.875 | 91.9 | 0.878 | 36.8 | EB | 86.4 |
| 7150 | 0.868 | 88 | 0.861 | 36.6 | EB | 77.3 |
| | 0.849 | 87.4 | 0.855 | 37.2 | EB | 80.2 |
| 2.3% < Mg < 3.0% | 0.967 | 98.4 | 0.951 | 35 | ED | 40.8 |
| | 0.95 | 94.1 | 0.918 | 35.9 | EB | 49.5 |
| | 0.923 | 91 | 0.888 | 36.9 | EC | 56.2 |
| | 0.91 | 89 | 0.868 | 37.5 | EB | 62.6 |
| | 0.934 | 97.2 | 0.939 | 35.8 | EC | 39.3 |
| | 0.91 | 94 | 0.908 | 36.7 | EB | 48.8 |
| | 0.886 | 92.6 | 0.895 | 37.3 | EB | 49.9 |
| Mg > 3.0% | 0.899 | 92.6 | 0.887 | 33.7 | EC | 27.6 |
| | 0.926 | 92.8 | 0.905 | 35.9 | EC | 27.7 |
| | 0.878 | 88.6 | 0.854 | 35.9 | EB | 45 |
| | 0.877 | 91 | 0.87 | 35.9 | EB | 25.6 |
| Undissolved Solute | 0.849 | 88.2 | 0.834 | 35.6 | EC | 34.7 |

Figure 2:
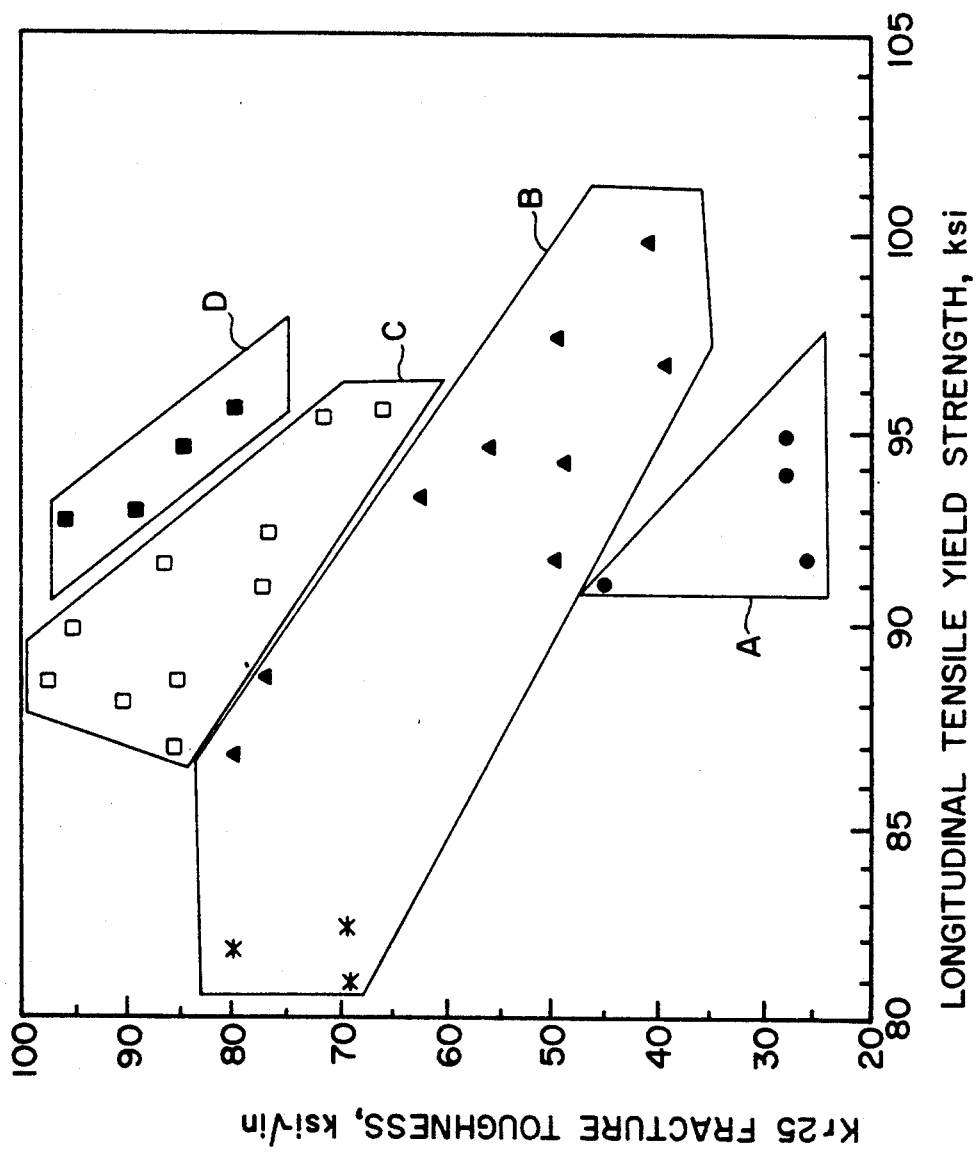
FIG. 2 is a graph plotting toughness versus longitudinal yield strength for certain 7XXX alloy products, including those made according to the invention.

The tensile yield strength and Kr25 toughness values for the Table 3 samples were then plotted along the x and y axes, respectively, of accompanying FIG. 2 The following explains the markings in FIG. 2:

(black square)—Invention Alloy
☐ (white square)—MG<2.3%
(black triangle)—2.3%<Mg<3.0%
(black circle)—MG>3.0%
* (star)—7150-T77 Typical.

It is believed that FIG. 2 underscores the importance of magnesium content for the improved alloy product of this invention and also shows the importance of controlling zinc and copper. In FIG. 2, strength/toughness data for alloys containing greater than about 3% magnesium are marked with a black circle " ● " and boxed within triangle A; alloys with about 2.3-3% magnesium are marked with a small black triangle "▲" (except for the typical strength-toughness values of 7150-T77 alloy products shown by the star symbol) and are boxed within polygon B; the same data for alloys containing less than about 2.3% magnesium are marked with a small square "☐" and boxed by polygon C. Note that these alloys (polygon C) either have Zn contents above those of the polygon D alloy or lower copper contents than the polygon D alloys. Strength/toughness values for the preferred embodiments of this invention which also contain less than about 2.3% magnesium, are marked with a filled black square "☐" and boxed in parallelogram D. FIG. 2 vividly distinguishes the improved combinations of properties attainable by this invention.

From the four groups of data points comprising FIG. 2, it is made clearer how the invention achieves greater combinations of these two important properties. In FIG. 2, strength levels typically increase from left to right along the horizontal (or x-axis), while toughnesses increase from the bottom to top of the Figure's y-axis as illustrated. Within data groupings A, B and C of FIG. 2, strength increases are typically traded for better toughness properties such that higher strengths may be achieved at lower toughnesses and vice versa. On the other hand, parallelogram D data points for the preferred alloy composition of this invention clearly show improvement in both strength and toughness by advancing outwardly along this Figure's x-axis as well as upwardly along its y-axis.

In following Table 4, 0.375-inch sections of labora- (black circle)—375° F. 2nd Stage Aging Temperature (black triangle)—390° F. 2nd Stage Aging Temperature □ (white square)—300° F. 2nd Stage Aging Temperature Δ (white triangle)—315° F. 2nd Stage Aging Temperature

* (star)—7150-T6 Typical

+ (plus symbol)—7150-T77 Typical.

Figure 3:
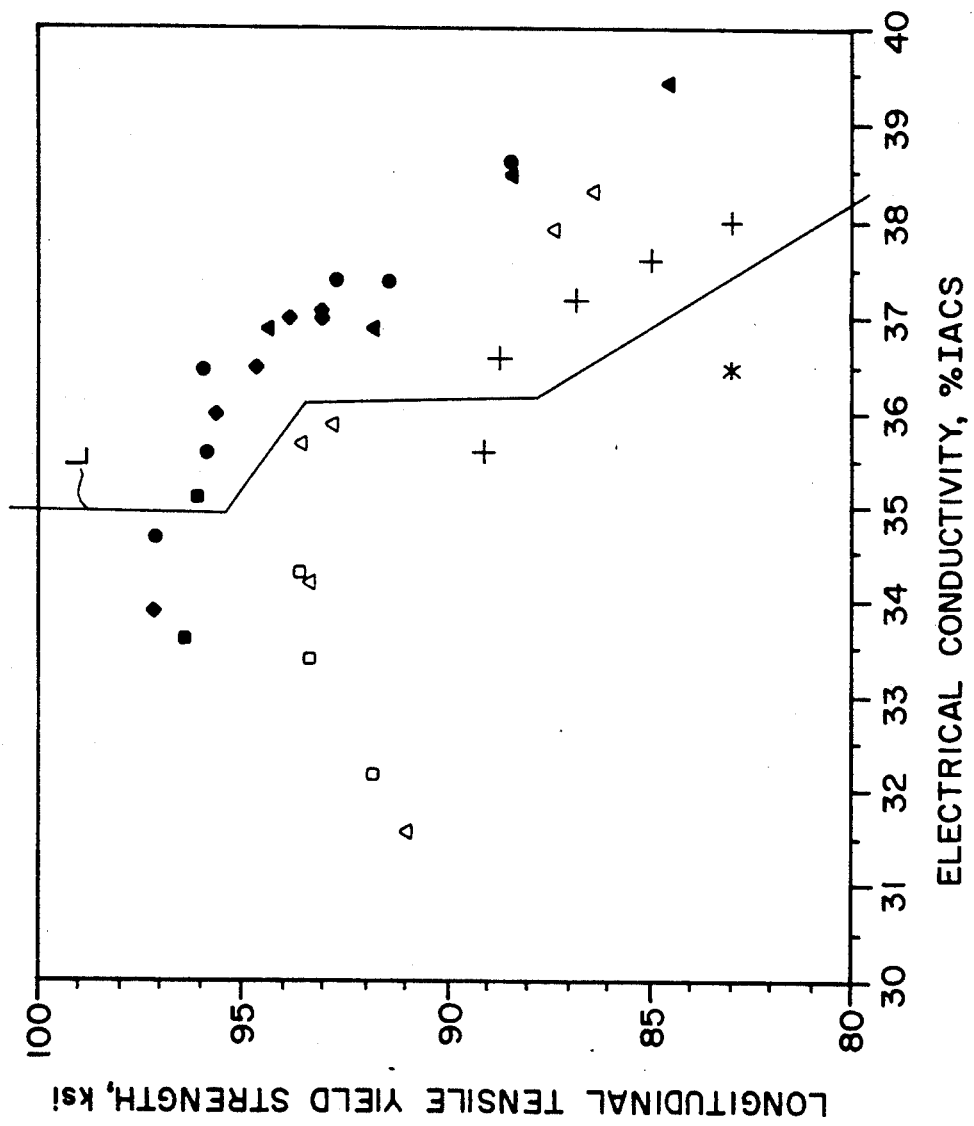
FIG. 3 is a graph plotting longitudinal yield strength versus electrical conductivity for one preferred composition treated at various second-step aging temperatures.

Actual EXCO test results of "EB" or better are then shown to the right of line L midway through FIG. 3. From this comparison, it is again made clear the extent to which the invention alloy outperforms its high strength 7150-T6 and 7150-T77 counterparts in terms of both strength and exfoliation resistance combinations.

TABLE 4

| 1st Step Temp. (°F.) | 1st Step Time (hr) | 2nd Step Temp. (°F.) | 2nd Step Time (hr) | 3rd Step Temp. (°F.) | 3rd Step Time (hr) | Tensile Yield Strength (ksi) | E.C. (% IACS) | EXCO* |
| --- | --- | --- | --- | --- | --- | --- | --- | --- |
| 250 | 24 | 345 | 0.5 | 250 | 24 | 96.4 | 33.6 | ED |
| 250 | 24 | 345 | 1 | 250 | 24 | 96.1 | 35.1 | EB |
| 250 | 24 | 360 | 0.25 | 250 | 24 | 97.1 | 33.9 | EC |
| 250 | 24 | 360 | 0.5 | 250 | 24 | 95.6 | 36 | EA |
| 250 | 24 | 360 | 0.75 | 250 | 24 | 93.8 | 37 | EA |
| 250 | 24 | 360 | 0.75 | 250 | 24 | 94.6 | 36.5 | EA |
| 250 | 24 | 360 | 1 | 250 | 24 | 93 | 37.1 | EB |
| 250 | 24 | 360 | 1 | 250 | 24 | 93 | 37 | EA |
| 250 | 24 | 375 | 0.17 | 250 | 24 | 97.1 | 34.7 | EC |
| 250 | 24 | 375 | 0.25 | 250 | 24 | 95.9 | 36.5 | EA |
| 250 | 24 | 375 | 0.25 | 250 | 24 | 95.8 | 35.6 | EB |
| 250 | 24 | 375 | 0.5 | 250 | 24 | 91.4 | 37.4 | EA |
| 250 | 24 | 375 | 0.58 | 250 | 24 | 92.7 | 37.4 | EA |
| 250 | 24 | 375 | 0.75 | 250 | 24 | 88.4 | 38.6 | EA |
| 250 | 24 | 390 | 0.17 | 250 | 24 | 94.4 | 36.9 | EA |
| 250 | 24 | 390 | 0.33 | 250 | 24 | 88.4 | 38.5 | EA |
| 250 | 24 | 390 | 0.5 | 250 | 24 | 84.6 | 39.4 | EA |
| 250 | 24 | 315 | 1 | — | — | 91 | 31.6 | ED |
| 250 | 24 | 315 | 3 | — | — | 93.3 | 34.2 | ED |
| 250 | 24 | 315 | 6 | — | — | 93.6 | 35.7 | ED |
| 250 | 24 | 315 | 6 | — | — | 92.8 | 35.9 | EB |
| 250 | 24 | 315 | 9 | — | — | 91.8 | 36.9 | EA |
| 250 | 24 | 315 | 12 | — | — | 87.4 | 37.9 | EA |
| 250 | 24 | 315 | 15 | — | — | 86.4 | 38.3 | EA |
| 250 | 24 | 300 | 3 | — | — | 91.8 | 32.2 | ED |
| 250 | 24 | 300 | 6 | — | — | 93.3 | 33.4 | ED |
| 250 | 24 | 300 | 9 | — | — | 93.6 | 34.3 | ED |

Strength-Corrosion Resistance Relationships for Invention Alloy 7.76% Zn 2.07% Mg 2.51% Cu ry-produced aluminum samples containing about 7.76% zinc, about 2.07% magnesium and about 2.51% copper and around 0.1% Zr were solution heat treated, stretched and artificially aged for various second stage times and temperatures according to the two preferred treatment methods described above. Tensile yield strengths, electrical conductivities (in terms of % IACS) and EXCO corrosion test results for each sample were then measured and plotted in accompanying FIG. 3. More specifically, plotted data points for alloys subjected to preferred 3-stage aging conditions are shown by solid shapes while strength-electrical conductivities values for 2-stage aged alloys are shown as hollow squares and triangles. Typical yield strength-electrical conductivity values for 7150-T6 (shown by the star symbol) and 7150-T77 (shown by the plus symbol "+") were plotted on this same graph for comparison purposes The following further explains the markings in FIG. 3:

(black square)—345° F. 2nd Stage Aging Temperature (black diamond)—360° F. 2nd Stage Aging Temperature The invention enables specifying combinations of properties very useful to airframe designers. The combination of strength with toughness or strength with corrosion resistance or strength with corrosion resistance and toughness is very useful in airframe design. This enables specifying levels of toughness or corrosion resistance, or both, currently considered useful and good in aircraft design in combination with higher strength levels.

Plate products according to the invention exhibit a minimum yield strength (0.2% offset), either tension or compression, or both, of 80 to 82 ksi or even 83 or 84 or 85 ksi or more. For instance, the invention plate (½ inch to 2½ inches thick) can exhibit minimum (guaranteeable) yield strength levels as follows:

85 or 86 ksi longitudinal direction in tension 85 or 86 ksi longitudinal direction in compression 84 or 85 ksi long transverse direction in tension 89 or 90 ksi long transverse direction in compression These good strength levels are achieved with good and useful levels of corrosion resistance or toughness, or both, for instance minimum levels of toughness or corrosion resistance similar to what was specified for previous high strength 7XXX type alloy plate products in relatively high strength tempers (the specifications for many such products didn't even specify toughness and/or corrosion resistance) but at a higher level of strength.

Extruded products according to the invention exhibit yield strength (0.2% offset) of about 84 ksi in the longitudinal direction, preferably 85 or 86 or 87 ksi or more, more preferably 88 or 89 or 90 ksi or more, in either tension or compression, preferably both. In the long transverse direction, the minimum yield strength in tension can be about 74 ksi or 75 or 76 ksi, preferably about 77 or 78 ksi. For instance, extrusions according to the invention can have the following minimum yield strength levels:
89 or 90 ksi in the longitudinal direction in tension
91 or 92 ksi in the longitudinal direction in compression
77 or 78 ksi in the long transverse direction in tension
These good strength levels are achieved with good and useful levels of corrosion resistance or toughness, or both, for instance minimum levels of toughness or corrosion resistance similar to what was specified for previous high strength 7XXX type alloy extruded products in relatively high strength tempers (the specifications for many such products didn't even specify toughness and/or corrosion resistance) but at a higher level of strength.

The exfoliation corrosion resistance for products in accordance with the invention can be EC or better ("or better" meaning EB or EA, that is, better performance in the test) in the EXCO test, typically EB or better, for test specimens taken at either T/2 or T/10 (T is thickness) or both. EXCO testing is described in ASTM G34, incorporated herein by reference. An EXCO rating of "EC" is considered good corrosion resistance in that it is considered acceptable for some commercial aircraft; "EB" is still better.

Stress corrosion cracking resistance across the short transverse direction is sometimes considered an important property especially in relatively thick members particularly for application in harsh environments such as naval aircraft. The stress corrosion cracking resistance for products in accordance with the invention in the short transverse direction can be equivalent to that needed to pass a C-ring or ⅛-inch round bar alternate immersion test for 20 days at 10 or 12 or 15 ksi, or more, for instance 17 or 20 ksi or more, using test procedures in accordance with ASTM G47 (including ASTM G44 and G38 for C-ring specimens and G49 for ⅛-inch bars), said ASTM G47, G44, G49 and G38 being incorporated herein by reference.

As a general indicator of exfoliation corrosion and stress corrosion resistance, the plate typically can have an electrical conductivity of 34.5 or 35, or preferably 35.5% or more of the International Annealed Copper Standard (IACS).

Thus, the good corrosion resistance of the invention is typically evidenced by an EXCO rating of "EC" or better, but in some cases other measures of corrosion resistance may be specified or required by airframe builders, such as stress corrosion cracking resistance or electrical conductivity. Satisfying any one or more of these specifications is considered good corrosion resistance.

Fracture toughness is another important property to airframe designers, particularly if good toughness can be combined with good strength. By way of comparison to tension testing, the strength, or ability to sustain load without fracturing, of a structural component under a tensile load can be defined as the load divided by the area of the smallest section of the component perpendicular to the tensile load (net section stress). For a simple, straight-sided structure, the strength of the section is readily related to the breaking or tensile strength of a smooth tensile coupon. This is how tension testing is done. However, for a structure containing a crack or crack-like defect, the strength of a structural component depends on the length of the crack, the geometry of the structural component, and a property of the material known as the fracture toughness. Fracture toughness can be thought of as the resistance of a material to the harmful or even catastrophic propagation of a crack under a tensile load. Fracture toughness for products in accordance with the invention compares with 7150-T651, a relatively high strength alloy previously used in airframe construction.

Fracture toughness can be measured in several ways. One way is to load in tension a test coupon containing a crack. The load required to fracture the test coupon divided by its net section area (the cross-sectional area less the area containing the crack) is known as the residual strength with units of thousands of pounds force per unit area (ksi). When the strength of the material as well as the specimen are constant, the residual strength is a measure of the fracture toughness of the material. Because it is so dependent on strength and geometry, residual strength is usually used as a measure of fracture toughness when other methods are not as useful because of some constraint like size or shape of the available material.

When the geometry of a structural component is such that it doesn't deform plastically through the thickness when a tension load is applied (plane-strain deformation), fracture toughness is often measured as plane-strain fracture toughness, $K_{Ic}$. This normally applies to relatively thick products or sections, for instance 0.6 or 0.75 or 1 inch or more. The ASTM has established a standard test using a fatigue pre-cracked compact tension specimen to measure $K_{Ic}$ which has the units ksi $\sqrt{in}$. This test is usually used to measure fracture toughness when the material is thick because it is believed to be independent of specimen geometry as long as appropriate standards for width, crack length and thickness are met. The symbol K, as used in $K_{Ic}$, is referred to as the stress intensity factor. A narrower test specimen width is sometimes used for thick sections and a wider test specimen width for thinner products.

Structural components which deform by plane-strain are relatively thick as indicated above. Thinner structural components usually deform under plane stress or more usually under a mixed mode condition. Measuring fracture toughness under this condition can introduce variables because the number which results from the test depends to some extent on the geometry of the test coupon. One test method is to apply a continuously increasing load to a rectangular test coupon containing a crack. A plot of stress intensity versus crack extension known as an R-curve (crack resistance curve) can be obtained this way. The load at a particular amount of crack extension based on a 25 degree secant offset in the load vs. crack extension curve and the crack length at that load are used to calculate a measure of fracture toughness known as $K_{R25}$. It also has the units of ksi $\sqrt{in}$. $K_{R25}$ is the toughness measure discussed earlier, for instance in Table 3. ASTM E561 (incorporated by reference) concerns R-curve determination.

When the geometry of the alloy product or structural component is such that it permits deformation plastically through its thickness when a tension load is applied, fracture toughness is often measured as plane-stress fracture toughness. The fracture toughness measure uses the maximum load generated on a relatively thin, wide pre-cracked specimen. When the crack length at the maximum load is used to calculate the stress-intensity factor at that load, the stress-intensity factor is referred to as plane-stress fracture toughness $K_c$. When the stress-intensity factor is calculated using the crack length before the load is applied, however, the result of the calculation is known as the apparent fracture toughness, $K_{app}$, of the material. Because the crack length in the calculation of $K_c$ is usually longer, values for $K_c$ are usually higher. Both of these measures of fracture toughness are expressed in the units ksi $\sqrt{in}$. For tough materials, the numerical values generated by such tests generally increase as the width of the specimen increases or its thickness decreases.

The fracture toughness for plate products according to the invention is such that a minimum $K_{Ic}$ of 19 or 20, preferably 21 or 22 ksi $\sqrt{inch}$ is achieved. This is measured by plane-strain fracture toughness-compact tension testing such as in accordance with ASTM E399 and ASTM B645 (both incorporated herein by reference) with the specimen oriented in the L-T orientation (specimen length parallel to rolling direction; crack perpendicular to the rolling direction). This test is suited to relatively thick products such as ½ inch or ⅝ inch or more, especially ¾ inch or more in thickness.

Another fracture toughness measure is plane-stress fracture toughness determined from a center cracked tension test. In this test, plate in accordance with the invention exhibits a minimum $K_{app}$ of about 50 or 55 ksi $\sqrt{in}$, preferably 60 or 65 or more, even 70 or more, ksi $\sqrt{in}$. This test can be conducted with an approximately 16-inch wide test specimen, but as a more convenient or less costly test a specimen about 6.3 inch wide can be used as a less precise but still meaningful indicator test. The plane-stress fracture toughness ($K_{app}$) test applies to all thicknesses of products but may in some applications find more use in thinner products such as 1 inch or ¾ inch or less in thickness, for example, ⅝ inch or ½ inch or less in thickness. The specimens for the immediately preceding tests are usually in the L-T orientation (specimen length parallel to rolling direction and crack perpendicular to the rolling direction) and can be taken at mid-thickness of the plate or at another location nearer the surface. The testing is in accordance with ASTM E561 and ASTM B646 (both incorporated herein by reference).

The fracture toughness for extruded products according to the invention is such that in a residual strength test, such as the Four Inch Center Crack Panel Test, the net area residual strength is at least 40 ksi, preferably at least 43 or at least 45 ksi. The particular test referred to is cyclically loaded in fatigue to make the center crack about 1¼ inches long after which the specimen is gradually tensioned to failure. Dividing the area of the metal remaining outside the approximately 1¼ inch crack into the failure load gives the residual strength. This test typically uses a specimen 4 inches wide by 0.25 inch thick and long enough to provide an 11-inch stretch length (11 inches plus grip provision on each end). Across the center of the 11-inch length is a transverse slot provided by sawing a slot about 0.75 inch long and about 0.062 inch wide. At each end of this transverse slot is a fine cut about 0.125 inch long and about 0.010 inch wide which can be a jeweler's saw cut. Thus the total cut length is 0.75 plus 0.125 at each end for a total of 1 inch. This slot-crack is fatigue pre-cracked to reach an overall length of around 1.25 inches to prepare for the fracture toughness test. The specimen is ramp loaded in tension to failure and that load divided by the residual area is the residual stress, the residual area being the remaining metal across the 4 inch width (4 inch width minus total crack length of around 1.25 inch) times the specimen thickness after failure.

Another fracture toughness test useful for extruded members is the plane-strain fracture toughness compact tension test such as in accordance with ASTM B645 and ASTM E399. Extrusions according to the invention achieve a fracture toughness of at least about 17, or preferably at least 18 or 19 ksi $\sqrt{in}$ or more, such as 20 ksi $\sqrt{in}$ minimum (guaranteeable) in the L-T orientation (specimen length parallel to extrusion length; specimen crack perpendicular to extrusion length and a minimum of about 13, preferably at least 14 or 15 ksi $\sqrt{in}$ or more, such as at least 16 ksi $\sqrt{in}$ in the T-L orientation (specimen length perpendicular to the extrusion length; specimen crack parallel to the extrusion length).

Toughness and corrosion measuring and testing has been described in some particularity, it being understood that the aforesaid testing is intended to illustrate the good property levels of the invention but not necessarily in limitation thereof. For instance, other methods of testing may be developed over time and the good performance of the invention can be measured by those methods as well. It is to be understood that the invention product properties are generally or substantially equivalent to the described test results regardless of the particular test method used. It is to be understood that the herein described practices, especially preferred practices, impart to the invention alloy a condition where it exhibits good property combinations useful in aerospace and other uses.

The invention provides products suitable for use in large airplanes, such as large commercial passenger and freight aircraft. Such products, themselves, are typically large, typically several feet in length, for instance 5 or 10 feet up to 50 feet or more. Yet even in these large sizes, the invention products achieve good property combinations. Hence, a particular advantage of the invention is sufficiently large size products to be suited to major structure components in aircraft, such as major wing components, wing box components, keel beam components, and the like, and subassemblies such as wing section, fuselage section, tail section (empennage).

The invention has been discussed mostly in terms of plate and extrusion, but is considered applicable to forgings and other product forms. Forgings are considered quite strong compared to some products, such as castings, but are usually sold in product conditions (temper, etc.) that exhibit lower yield strength than plate or extrusion products. For instance, 7050 forgings (normally sold in T7-type tempers such as T7, T74 and T7452 tempers) are supplied to purchase specifications requiring minimum yield strengths of 50 to 63 ksi based on product thickness and test specimen orientation, whereas 7150 plate specifications can require minimum yield strength of 78 ksi (see Table 1).

Table 5 below sets forth examples of minimum yield strength levels for 7050 forgings (in T7-type tempers).

TABLE 5

| Product Form | Thickness | Minimum Yield Strength (ksi) | Test Direction |
| --- | --- | --- | --- |
| Hand Forgings | up to 2" | 63 | Longitudinal |
| | | 61 | Long Transverse |
| | 2–3" | 62 | Longitudinal |
| | | 60 | Long Transverse |
| | | 55 | Short Transverse |
| | 3–4" | 61 | Longitudinal |
| | | 59 | Long Transverse |
| | | 55 | Short Transverse |
| | 4–5" | 60 | Longitudinal |
| | | 58 | Long Transverse |
| | | 54 | Short Transverse |
| | 5–6" | 59 | Longitudinal |
| | | 56 | Long Transverse |
| | | 53 | Short Transverse |
| | 6–7" | 58 | Longitudinal |
| | | 54 | Long Transverse |
| | | 51 | Short Transverse |
| | 7–8" | 57 | Longitudinal |
| | | 52 | Long Transverse |
| | | 50 | Short Transverse |
| Die Forgings | up to 2" | 56 | |
| | 2–4" | 55 | |
| | 4–5" | 54 | |
| | 5–6" | 54 | |

Forgings in the improved alloy are considered to exhibit improvements of 5% or 7% or 10% or more above the yield strength levels in Table 5, along with good corrosion resistance suited to forging applications, for instance, stress corrosion cracking resistance.

The invention is considered suited to age forming wherein a load is imposed on a product, such as a plate product, during an artificial aging treatment at elevated temperatures (for example 250° F. or more) sufficient to form (or deform) the product into a shaped or partially shaped product. An autoclave can be useful for this treatment. After the product has cooled, it will have a shape generally conforming to that achieved during the age forming, but some allowance for spring-back should be made. Age forming can be performed during the third phase of a low-high-low temperature artificial aging treatment.

Preferred embodiments of this invention possess improved combinations of strength, fracture toughness and corrosion resistance that were not previously attained with high zinc-aluminum alloys. Because such property combinations are achieved with little cost to alloy density, the invention is especially well suited for many critical aerospace applications, including upper wing assemblies and the like. In a broader sense, though, it is believed that the strength, toughness and corrosion resistance improvements realized by this invention can translate to an entire family of aluminum-zinc alloys containing 7 or 8% to 10% Zn wherein each family member comprises less than about 2.3% magnesium, with zinc and copper contents varying according to the following relationship: for every 0.5% that zinc levels exceed 8% (up to a maximum of about 11% zinc), the total copper contents should be reduced 0.2% from a maximum of about 2.5% copper. Under this formulation, alloys having the following nominal amounts of designated elements would be illustrative of this family:

TABLE 6

| Alloy No. | Alloy Family Members | | |
| --- | --- | --- | --- |
| | Zn (%) | Mg (%) | Cu (%) |
| 1 | 8 | 2 | 2.5 |
| 2 | 8.5 | 2 | 2.3 |
| 3 | 9 | 2 | 2.1 |
| 4 | 9.5 | 2 | 1.9 |
| 5 | 10 | 2 | 1.7 |
| 6 | 10.5 | 2 | 1.5 |

Although alloys 2 through 6 generally possess lower strength, toughness and/or corrosion resistance properties than preferred embodiments (e.g. alloy 1) of the invention, some may still exhibit improved combinations of properties which are greater than those of their 7050 and 7150 counterparts. Comparative properties for several members of this alloy family are illustrated within polygon C of FIG. 2, such as alloy No. 6 from Table 6 which can have a range of about 10.1 to 10.9% zinc, about 1.8 to 2.2% magnesium, and about 1.2 to 1.8% copper, the balance being as otherwise set forth hereinabove, including one or more of zirconium, hafnium and/or vanadium (with or without manganese.

Having described the presently preferred embodiments, it is to be understood that the invention may be otherwise embodied within the scope of the appended claims.

What is claimed is:

1. An aluminum alloy product having good strength along with good toughness or corrosion resistance, or both, said alloy consisting essentially of about, by weight, 7.6 to about 8.4% zinc, about 1.8 to about 2.2% magnesium, about 2.1 to about 2.6% copper and at least one element present in an amount not exceeding about 0.5%, said element selected from zirconium, vanadium and hafnium, the balance substantially aluminum and incidental elements and impurities.

2. The alloy product of claim 1 wherein said alloy contains, by weight, about 0.1 to 0.35% manganese.

3. The alloy product of claim 1 wherein said alloy contains, by weight, less than about 0.4% total iron, silicon and other impurities.

4. The alloy product of claim 1 wherein said alloy contains, by weight, about 0.03 to 0.1% iron and about 0.03 to 0.1% silicon.

5. An alloy product having good yield strength together with good toughness or corrosion resistance, or both, said alloy consisting essentially of, by weight, about 7.6 to about 8.4% zinc; about 1.8 to about 2.2% magnesium; about 2.1 to about 2.6% copper; about 0.03 to about 0.3% zirconium, no more than about 0.25% iron and no more than about 0.25% silicon, the balance substantially aluminum and incidental elements and impurities.

6. The alloy product of claim 5 wherein said alloy contains one or more of: about 0.05 to 0.15% vanadium, about 0.03 to 0.4% hafnium, about 0.1 to 0.35% manganese, about 0.03 to 0.1% iron and about 0.03 to 0.1% silicon, percentages by weight.

7. The alloy product of claim 5 which has an EXCO exfoliation corrosion resistance level of "EB" or better and a minimum longitudinal yield strength at least about 15% greater than the minimum yield strength required for a similarly-sized 7X50 product in the T76 temper.

8. The alloy product of claim 5 which has an EXCO exfoliation corrosion resistance level of "EB" or better and a minimum longitudinal yield strength at least about 10% greater than the minimum yield strength required for a similarly-sized 7X50 product in the T6 temper.

9. The alloy product of claim 5 which has an EXCO exfoliation corrosion resistance level of "EB" or better and a minimum longitudinal yield strength at least about 5% greater than the minimum yield strength required for a similarly-sized 7X50 product in the T77 temper.

10. An aluminum alloy product having good strength along with good toughness or corrosion resistance, or both, said alloy consisting essentially of about, by weight, 7.6 to about 8.4% zinc, about 1.8 to about 2.2% magnesium, about 2.1 to about 2.6% copper, about 0.03 to about 0.3% zirconium, the balance substantially aluminum and incidental elements and impurities.

11. The wrought product of claim 10 which is sheet or plate having a minimum longitudinal yield strength of at least 82 ksi and an EXCO exfoliation corrosion resistance level of "EB" or better.

12. The wrought product of claim 10 which is an extrusion having a minimum longitudinal yield strength of at least 86 ksi and an EXCO exfoliation corrosion resistance level of "EB" or better.

13. An alloy product suitable for aerospace applications and having good strength and toughness combined with an EXCO exfoliation corrosion resistance level of "EC" or better, said product comprising an alloy consisting essentially of, by weight, about 7.8 to about 8.2% zinc, about 1.8 to about 2.1% magnesium, about 2.2 to about 2.5% copper, about 0.03 to about 0.25% zirconium, the balance substantially aluminum and incidental elements and impurities.

14. The alloy product of claim 13 which has been solution heat treated and then artificially aged including:
   (a) heating to one or more temperatures within about 175° to 325° F. for a cumulative time of about 2 or more hours;
   (b) heating for a cumulative time-temperature effect within the perimeter ABCD of FIG. 1; and
   (c) heating to one or more temperatures within about 175° to 325° F. for a cumulative time of about 3 or more hours.

15. The alloy product of claim 13 which has been solution heat treated and then artificially aged including:
   (a) heating to one or more temperatures within about 175° to 285° F. for a cumulative time of about 2 or more hours; and
   (b) heating to one or more temperatures within about 300° to 350° F. for a cumulative time of about 5 or more hours.

16. The alloy product of claim 13 which is plate suitable for use as an upper wing member.

17. A plate product having a cross-sectional thickness between about 0.3 and 3 inches, about 84 ksi or better minimum yield strength, a Kr25 fracture toughness of about 70 ksi-in$^{\frac{1}{2}}$ or better, and an EXCO exfoliation corrosion resistance level of "EC" or better, said plate product comprising an alloy consisting essentially of about 7.6 to about 8.4% zinc, about 1.8 to about 2.2% magnesium, about 2.1 to about 2.6% copper, about 0.03 to about 0.25% zirconium, the balance substantially aluminum and incidental elements and impurities.

18. An extrusion having a cross-section including a thickness less than about 3 inches, yield strength greater than 86 ksi, a Kr25 fracture toughness of about 70 ksi-in$^{\frac{1}{2}}$ or better, and an EXCO exfoliation resistance level of "EC" or better, said extrusion comprising an alloy consisting essentially of, by weight, about 7.6 to about 8.4% zinc, about 1.8 to about 2.2% magnesium, about 2.1 to about 2.6% copper, about 0.03 to about 0.2% zirconium, the balance substantially aluminum and incidental elements and impurities.

19. An aerospace structural member having a yield strength of at least 84 ksi, good fracture toughness and an EXCO exfoliation resistance level of "EC" or better, said structural member comprising an alloy consisting essentially of, by weight, about 7.6 to about 8.4% zinc, about 1.8 to about 2.2% magnesium, about 2.1 to about 2.6% copper, about 0.03 to about 0.3% zirconium, not more than about 0.2% iron and not more than about 0.2% silicon, the balance substantially aluminum and incidental elements and impurities.

20. The structual member of claim 19 which has been solution heat treated and then artificially aged including:
   (a) heating to one or more temperatures within about 175° to 325° F. for a cumulative time of about 2 or more hours;
   (b) heating for a cumulative time-temperature effect within the perimeter ABCD of FIG. 1; and
   (c) heating to one or more temperatures within about 175° to 325° F. for a cumulative time of about 3 or more hours.

21. The structural member of claim 19 which has been solution heat treated and then artificially aged including:
   (a) heating to one or more temperatures within about 175° to 285° F. for a cumulative time of about 2 or more hours; and
   (b) heating to one or more temperatures within about 300° to 350° F. for a cumulative time of about 5 or more hours.

22. The structural member of claim 19 which is an upper member in an airplane wing structure.

23. The alloy product of claim 10 which has a minimum yield strength of at least 84 ksi and an EXCO exfoliation corrosion resistance level of "EC" or better.

24. The alloy product of claim 10 wherein said alloy contains, by weight, about 0.03 to 0.1% iron and about 0.03 to 0.1% silicon.

25. The alloy product of claim 10 which has a minimum yield strength at least about 84 ksi.

26. The wrought product of claim 10 which has an EXCO exfoliation corrosion resistance level of "EB" or better and a Kr25 fracture toughness of about 70 ksi-in$^{\frac{1}{2}}$ or better.

27. The wrought product of claim 10 which has an EXCO exfoliation corrosion resistance level of "EB" or better.

28. The wrought product of claim 10 which has a Kr25 fracture toughness of about 70 ksi-in$^{\frac{1}{2}}$ or better.

29. The wrought product of claim 10 which has a minimum yield strength of at least 82 ksi or better and a Kr25 fracture toughness of about 70 ksi-in$^{\frac{1}{2}}$ or better.

30. The wrought product of claim 10 which has a minimum yield strength greater than about 82 ksi, an EXCO exfoliation corrosion resistance level of "EB" or better and a Kr25 fracture toughness of about 70 ksi-in$^{\frac{1}{2}}$ or better.

31. The wrought product of claim 10 which is sheet or plate having a minimum yield strength greater than about 82 ksi.

32. The wrought product of claim 10 which is an extrusion having a minimum yield strength of at least about 86.

33. The wrought product of claim 10 which is sheet or plate having a yield strength of at least about 82 ksi and a Kr25 fracture toughness of about 70 ksi-in$^{\frac{1}{2}}$ or better.

34. The wrought product of claim 10 which is an extrusion having a yield strength of at least about 86 ksi and a Kr25 fracture toughness of about 70 ksi-in$^{\frac{1}{2}}$ or better.

35. The wrought product of claim 10 wherein said alloy contains one or more of, by weight: about 0.05 to 0.15% vanadium, about 0.03 to 0.4% hafnium and about 0.1 to 0.35% manganese.

36. A wrought alloy product having good strength, toughness and corrosion resistance properties, said product comprising an alloy consisting essentially of, by weight, about 7.6 to about 8.4% zinc, about 1.8 to about 2.2% magnesium, about 2.2 to about 2.6% copper, and about 0.03 to about 0.2% zirconium, the balance substantially aluminum and incidental elements and impurities.

37. The wrought product of claim 36 which is sheet or plate having a minimum yield strength of at least 84 ksi and an EXCO exfoliation corrosion resistance level of "EC" or better.

38. The wrought product of claim 36 which is an extrusion having a minimum yield strength of at least 88 ksi and an EXCO exfoliation resistance level of "EC" or better.

39. The wrought product of claim 36 which has a Kr25 fracture toughness of about 70 ksi-in$^{\frac{1}{2}}$ or better.

40. The wrought product of claim 36 which is an extrusion having a minimum yield strength of at least about 89 ksi.

41. The wrought product of claim 36 which is an extrusion having a minimum yield strength of at least 88 ksi or better and a minimum fracture toughness of about 40 ksi or better net area residual strength.

42. The wrought product of claim 36 wherein said alloy contains one or more of, by weight: about 0.05 to 0.15% vanadium, about 0.03 to 0.4% hafnium and about 0.1 to 0.35% manganese.

43. The alloy product of claim 10 which has been solution heat treated and then artificially aged including:
(a) heating to one or more temperatures within about 175° to 325° F. for a cumulative time of about 2 or more hours;
(b) heating for a cumulative time-temperature effect within the perimeter ABCD of FIG. 1; and
(c) heating to one or more temperatures within about 175° to 325° F. for a cumulative time of about 3 or more hours.

44. The wrought product of claim 10 which has been solution heat treated and then artificially aged including:
(a) heating to one or more temperatures within about 175° to 285° F. for a cumulative time of about 2 or more hours; and
(b) heating to one or more temperatures within about 300° to 350° F. for a cumulative time of about 5 or more hours.

45. The wrought product of claim 10 which is suitable for use as an aerospace upper wing member.

46. An alloy product suitable for aerospace applications and having a minimum yield strength of at least about 85 ksi and good toughness and an EXCO exfoliation corrosion resistance level of "EC" or better, said alloy product comprising an alloy consisting essentially of about 7.8 to about 8.2% zinc, about 1.8 to about 2.1% magnesium, about 2.2 to about 2.5% copper, about 0.03 to about 0.25% zirconium, the balance substantially aluminum and incidental elements and impurities.

47. The alloy product of claim 46 which has been solution heat treated and then artificially aged including:
(a) heating to one or more temperatures within about 175° to 325° F. for a cumulative time of about 2 or more hours;
(b) heating for a cumulative time-temperature effect within the perimeter ABCD of FIG. 1; and
(c) heating to one or more temperatures within about 175° to 325° F. for a cumulative time of about 3 or more hours.

48. The alloy product of claim 46 which has been solution heat treated and then artificially aged including:
(a) heating to one or more temperatures within about 175° to 285° F. for a cumulative time of about 2 or more hours; and
(b) heating to one or more temperatures within about 300° to 345° F. for a cumulative time of about 5 or more hours.

49. The alloy product of claim 46 which is an upper member in an airplane wing structure.

50. The alloy product of claim 46 which is an extrusion having a yield strength of at least 88 ksi.

51. The alloy product of claim 46 wherein said alloy contains one or more of: about 0.05 to 0.15% vanadium, about 0.03 to 0.4% hafnium and about 0.1 to 0.35% manganese.

52. The plate product of claim 17 wherein said alloy contains less than about 0.2% iron and less than about 0.2% silicon.

53. The plate product of claim 17 wherein said alloy contains one or more of: about 0.05 to 0.15% vanadium, about 0.03 to 0.4% hafnium and about 0.1 to 0.35% manganese.

54. The extrusion of claim 18 wherein said alloy contains less than about 0.2% iron and less than about 0.2% silicon.

55. The extrusion of claim 18 wherein said alloy contains one or more of: about 0.05 to 0.15% vanadium, about 0.03 to 0.4% hafnium and about 0.1 to 0.35% manganese.

56. The structural member of claim 19 wherein said alloy contains no more than about 0.15% iron and no more than about 0.15% silicon.

57. The structural member of claim 19 wherein said alloy contains one or more of: about 0.05 to 0.15% vanadium, about 0.03 to 0.4% hafnium and about 0.1 to 0.35% manganese.

58. The alloy product of claim 1 wherein said alloy contains about 1.8 to about 2.1% magnesium.

59. The alloy product of claim 5 wherein said alloy contains about 1.8 to about 2.1% magnesium.

60. The wrought product of claim 10 wherein said alloy contains about 1.8 to about 2.1% magnesium.

61. The plate product of claim 17 wherein said alloy contains about 1.8 to about 2.1% magnesium.

62. The extrusion of claim 18 wherein said alloy contains about 1.8 to about 2.1% magnesium.

63. The wrought product of claim 36 wherein said alloy contains about 1.8 to about 2.1% magnesium.

64. The alloy product of claim 6 wherein said alloy contains about 1.8 to about 2.1% magnesium.

65. The alloy product of claim 5 which has been solution heat treated and artificially aged including:
(a) heating to one or more temperatures within about 175° to 325° F. for a cumulative time of about 2 or more hours;
(b) heating to one or more temperatures within about 400° to 340° F. for a cumulative time of about 5 to 60 minutes; and
(c) heating to one or more temperatures within about 175° to 325° F. for a cumulative time of about 3 or more hours.

66. The alloy product of claim 5 which has been solution heat treated and artificially aged including:
(a) heating to one or more temperatures within about 175° to 285° F. for about 2 or more hours; and
(b) heating to one or more temperatures within about 300° to 345° F. for about 2 or more hours.

67. The wrought product of claim 36 which has a yield strength greater than about 82 ksi, an EXCO exfoliation corrosion resistance level of "EB" or better, and a Kr25 fracture toughness of about 70 ksi-in$^{\frac{1}{2}}$ or better.

68. The wrought product of claim 36 which has been solution heat treated and artificially aged including:
(a) heating to one or more temperatures within about 175° to 325° F. for a cumulative time of about 2 or more hours;
(b) heating to one or more temperatures within about 400° to 340° F. for a cumulative time of about 5 to 60 minutes; and
(c) heating to one or more temperatures within about 175° to 325° F. for a cumulative time of about 3 or more hours.

69. The wrought product of claim 36 which has been solution heat treated and artificially aged including:
(a) heating to one or more temperatures within about 175° to 285° F. for a cumulative time of about 2 or more hours; and
(b) heating to one or more temperatures within about 300° to 345° F. for a cumulative time of about 2 or more hours.

70. The alloy product of claim 46 which has been solution heat treated and artificially aged including:
(a) heating to one or more temperatures within about 175° to 325° F. for a cumulative time of about 2 or more hours;
(b) heating to one or more temperatures within about 400° to 340° F. for a cumulative time of about 5 to 60 minutes; and
(c) heating to one or more temperatures within about 175° to 325° F. for a cumulative time of about 3 or more hours.

71. The alloy product of claim 46 which has been solution heat treated and artificially aged including:
(a) heating to one or more temperatures within about 175° to 285° F. for a cumulative time of about 2 or more hours; and
(b) heating to one or more temperatures within about 300° to 345° F. for a cumulative time of about 2 or more hours.

72. The wrought product of claim 36 which has a yield strength exceeding 82 ksi and an EXCO exfoliation corrosion resistance level of "EB" or better.

73. The wrought product of claim 10 which is sheet or plate product having a minimum longitudinal yield strength of at least about 84 ksi and an EXCO exfoliation corrosion resistance level of "EC" or better.

74. The wrought product of claim 10 which is sheet or plate product having a minimum longitudinal yield strength of at least about 85 ksi and an EXCO exfoliation corrosion resistance level of "EC" or better.

75. The wrought product of claim 10 which is an extrusion having a minimum longitudinal yield strength of at least about 88 ksi and an EXCO exfoliation corrosion resistance level of "EC" or better.

76. The wrought product of claim 10 which is an extrusion having a minimum longitudinal yield strength of at least about 89 ksi and an EXCO exfoliation corrosion resistance level of "EC" or better.

77. The alloy product of claim 10 which has a yield strength exceeding 82 ksi and an EXCO exfoliation corrosion resistance level of "EB" or better.

78. The alloy product of claim 10 which is a sheet or plate product having a longitudinal yield strength of at least 84 ksi and an EXCO exfoliation corrosion resistance of "EB" or better.

79. The alloy product of claim 10 which is a sheet or plate product having a longitudinal yield strength of at least 84 ksi and an EXCO exfoliation corrosion resistance of "EC" or better and a short transverse stress corrosion cracking resistance equal to or better than passing a 20-day alternate immersion test of 20 days at a stress level of 13 ksi.

80. The alloy product of claim 10 which is a sheet or plate product having a minimum longitudinal yield strength of at least 84 ksi and an EXCO exfoliation corrosion resistance of "EB" or better.

81. The alloy product of claim 10 which is a sheet or plate product having a minimum longitudinal yield strength of at least 84 ksi and an L-T fracture toughness, $K_{app}$, of 55 ksi $\sqrt{in}$ or more.

82. The alloy product of claim 10 which is a sheet or plate product having a minimum longitudinal yield strength of at least 84 ksi and an L-T fracture toughness, $K_{app}$, of 60 ksi $\sqrt{in}$ or more.

83. The alloy product of claim 10 which is a sheet or plate product having a minimum longitudinal yield strength of at least 84 ksi and an L-T fracture toughness, $K_{app}$, of 65 ksi $\sqrt{in}$ or more.

84. The alloy product of claim 10 which is a sheet or plate product having a minimum longitudinal yield strength of at least 84 ksi and an L-T fracture toughness, $K_{app}$, of 70 ksi $\sqrt{in}$ or more.

85. The alloy product of claim 10 which is a sheet or plate product having a minimum longitudinal yield strength of at least 84 ksi and an L-T fracture toughness, $K_{app}$, of 55 ksi $\sqrt{in}$ or more and an EXCO exfoliation resistance of "EC" or better.

86. The alloy product of claim 10 which is a sheet or plate product having a minimum longitudinal yield strength of at least 84 ksi and an L-T fracture toughness, $K_{app}$, of 60 ksi $\sqrt{in}$ or more and an EXCO exfoliation resistance of "EC" or better.

87. The alloy product of claim 10 which is a sheet or plate product having a longitudinal yield strength of at least 84 ksi and an L-T fracture toughness, $K_{app}$, of 65 ksi $\sqrt{in}$ or more and an EXCO exfoliation resistance of "EC" or better.

88. The alloy product of claim 10 which is a sheet or plate product having a longitudinal yield strength of at least 84 ksi and an L-T fracture toughness, $K_{app}$, of 55 ksi $\sqrt{in}$ or more and an EXCO exfoliation resistance of "EB" or better.

89. The alloy product of claim 10 which is a sheet or plate product having a longitudinal yield strength exceeding 84 ksi and an L-T fracture toughness, $K_{app}$, of 60 ksi $\sqrt{\text{in}}$ or more and an EXCO exfoliation resistance of "EB" or better.

90. The alloy product of claim 10 which is a sheet or plate product having a longitudinal yield strength exceeding 84 ksi and an L-T fracture toughness, $K_{app}$, of 65 ksi $\sqrt{\text{in}}$ or more and an EXCO exfoliation resistance of "EB" or better.

91. The alloy product of claim 10 which is a sheet or plate product having a longitudinal yield strength of at least 86 ksi and an EXCO exfoliation corrosion resistance of "EC" or better.

92. The alloy product of claim 10 which is a sheet or plate product having a minimum longitudinal yield strength of at least 86 ksi and an L-T fracture toughness, $K_{app}$, of 55 ksi $\sqrt{\text{in}}$ or more.

93. The alloy product of claim 10 which is a sheet or plate product having a longitudinal yield strength of at least 86 ksi and an L-T fracture toughness, $K_{app}$, of 60 ksi $\sqrt{\text{in}}$ or more.

94. The alloy product of claim 10 which is a sheet or plate product having a longitudinal yield strength of at least 86 ksi and an L-T fracture toughness, $K_{app}$, of 65 ksi $\sqrt{\text{in}}$ or more.

95. The alloy product of claim 10 which is a sheet or plate product having a minimum longitudinal yield strength of at least 84 ksi and an L-T fracture toughness, $K_{Ic}$, of 20 ksi $\sqrt{\text{in}}$ or more.

96. The alloy product of claim 10 which is a sheet or plate product having a minimum longitudinal yield strength of at least 84 ksi and an L-T fracture toughness, $K_{Ic}$, of 21 ksi $\sqrt{\text{in}}$ or more.

97. The alloy product of claim 10 which is a sheet or plate product having a minimum longitudinal yield strength of at least 84 ksi and an L-T fracture toughness, $K_{Ic}$, of 22 ksi $\sqrt{\text{in}}$ or more.

98. The alloy product of claim 10 which is a sheet or plate product having a minimum longitudinal yield strength of at least 84 ksi and an L-T fracture toughness, $K_{Ic}$, of 20 ksi $\sqrt{\text{in}}$ or more and an EXCO exfoliation resistance of "EC" or better.

99. The alloy product of claim 10 which is a sheet or plate product having a minimum longitudinal yield strength of at least 84 ksi and an L-T fracture toughness, $K_{Ic}$, of 21 ksi $\sqrt{\text{in}}$ or more and an EXCO exfoliation resistance of "EC" or better.

100. The alloy product of claim 10 which is a sheet or plate product having a minimum longitudinal yield strength of at least 84 ksi and an L-T fracture toughness, $K_{Ic}$, of 22 ksi $\sqrt{\text{in}}$ or more and an EXCO exfoliation resistance of "EC" or better.

101. The alloy product of claim 10 which is a sheet or plate product having a minimum longitudinal yield strength of at least 84 ksi and an L-T fracture toughness, $K_{Ic}$, of 20 ksi $\sqrt{\text{in}}$ or more and an EXCO exfoliation resistance of "EB" or better.

102. The alloy product of claim 10 which is a sheet or plate product having a minimum longitudinal yield strength of at least 84 ksi and an L-T fracture toughness, $K_{Ic}$, of 21 ksi $\sqrt{\text{in}}$ or more and an EXCO exfoliation resistance of "EB" or better.

103. The alloy product of claim 10 which is a sheet or plate product having a minimum longitudinal yield strength of at least 84 ksi and an L-T fracture toughness, $K_{Ic}$, of 22 ksi $\sqrt{\text{in}}$ or more and an EXCO exfoliation resistance of "EB" or better.

104. The alloy product of claim 10 which is a sheet or plate product having a minimum longitudinal yield strength of at least 86 ksi and an L-T fracture toughness, $K_{Ic}$, of 20 ksi $\sqrt{\text{in}}$ or more.

105. The alloy product of claim 10 which is a sheet or plate product having a minimum longitudinal yield strength of at least 86 ksi and an L-T fracture toughness, $K_{Ic}$, of 21 ksi $\sqrt{\text{in}}$ or more.

106. The alloy product of claim 10 which is a sheet or plate product having a minimum longitudinal yield strength of at least 86 ksi and an L-T fracture toughness, $K_{Ic}$, of 22 ksi $\sqrt{\text{in}}$ or more.

107. The alloy product of claim 10 which is a sheet or plate product having a minimum longitudinal yield strength of at least 86 ksi and an L-T fracture toughness, $K_{Ic}$, of 20 ksi $\sqrt{\text{in}}$ or more and an EXCO exfoliation resistance of "EC" or better.

108. The alloy product of claim 10 which is a sheet or plate product having a minimum longitudinal yield strength of at least 86 ksi and an L-T fracture toughness, $K_{Ic}$, of 21 ksi $\sqrt{\text{in}}$ or more and an EXCO exfoliation resistance of "EC" or better.

109. The alloy product of claim 10 which is a sheet or plate product having a minimum longitudinal yield strength of at least 86 ksi and an L-T fracture toughness, $K_{Ic}$, of 22 ksi $\sqrt{\text{in}}$ or more and an EXCO exfoliation resistance of "EC" or better.

110. The alloy product of claim 10 which is extruded having a minimum longitudinal yield strength greater than 87 ksi and an EXCO exfoliation corrosion resistance of "EC" or better.

111. The alloy product of claim 10 which is extruded having a minimum longitudinal yield strength 87 ksi or more and an EXCO exfoliation corrosion resistance of "EC" or better and a short transverse stress corrosion cracking resistance equal to or better than passing a 20-day alternate immersion test of 20 days at a stress level of 13 ksi.

112. The alloy product of claim 10 which is extruded having a minimum longitudinal yield strength of 87 ksi or more and an EXCO exfoliation corrosion resistance of "EB" or better.

113. The alloy product of claim 10 which is an extruded product having a longitudinal yield strength of 87 ksi or more and an L-T fracture toughness sufficient to exhibit a net area residual strength of at least 40 ksi in a four-inch center crack panel test or the substantial equivalent thereof.

114. The alloy product of claim 10 which is extruded having a minimum longitudinal yield strength of 89 ksi or more and an L-T fracture toughness sufficient to exhibit a net area residual strength of at least 43 ksi in a four-inch center crack panel test or the substantial equivalent thereof.

115. The alloy product of claim 10 which is extruded having a minimum longitudinal yield strength of 89 ksi or more and an L-T fracture toughness sufficient to exhibit a net area residual strength of at least 45 ksi in a four-inch center crack panel test or the substantial equivalent thereof.

116. The alloy product of claim 10 which is extruded having a minimum longitudinal yield strength of 88 ksi or more and an L-T fracture toughness sufficient to exhibit a net area residual strength of at least 40 ksi in a four-inch center crack panel test or the substantial equivalent thereof and an EXCO exfoliation corrosion resistance level of "EC" or better.

117. The alloy product of claim 10 which is extruded having a minimum longitudinal yield strength of 89 ksi or more and an L-T fracture toughness sufficient to exhibit a net area residual strength of at least 43 ksi in a four-inch center crack panel test or the substantial equivalent thereof and an EXCO exfoliation corrosion resistance level of "EC" or better.

118. The alloy product of claim 10 which is extruded having a minimum longitudinal yield strength of 88 ksi or more and an L-T fracture toughness sufficient to exhibit a net area residual strength of at least 45 ksi in a four-inch center crack panel test or the substantial equivalent thereof and an EXCO exfoliation corrosion resistance level of "EC" or better.

119. In an airplane, an assembly or subassembly comprising an aluminum alloy member, said alloy consisting essentially of about, by weight, 7.6 to about 8.4% zinc, about 1.8 to about 2.2% magnesium, about 2.1 to about 2.6% copper, about 0.03 to about 0.3% zirconium, the balance substantially aluminum and incidental elements and impurities.

120. In an airplane, an assembly or subassembly comprising an aluminum alloy wing member, said alloy consisting essentially of about, by weight, 7.6 to about 8.4% zinc, about 1.8 to about 2.2% magnesium, about 2.1 to about 2.6% copper, about 0.03 to about 0.3% zirconium, the balance substantially aluminum and incidental elements and impurities.

121. An airplane assembly or subassembly comprising an aluminum alloy member, said alloy consisting essentially of about, by weight, 7.6 to about 8.4% zinc, about 1.8 to about 2.2% magnesium, about 2.1 to about 2.6% copper, about 0.03 to about 0.3% zirconium, the balance substantially aluminum and incidental elements and impurities, said member having a longitudinal yield strength of at least 84 ksi and an EXCO exfoliation corrosion resistance of "EC" or better and good fracture toughness.

122. An airplane assembly or subassembly comprising an aluminum alloy member, said alloy consisting essentially of about, by weight, 7.6 to about 8.4% zinc, about 1.8 to about 2.2% magnesium, about 2 to about 2.6% copper, about 0.03 to about 0.3% zirconium, the balance substantially aluminum and incidental elements and impurities, said member having a longitudinal yield strength greater than 84 ksi together with good fracture toughness or good corrosion resistance, or both.

123. An airplane assembly or subassembly comprising an aluminum alloy wing member, said alloy consisting essentially of about, by weight, 7.6 to about 8.4% zinc, about 1.8 to about 2.2% magnesium, about 2.1 to about 2.6% copper, about 0.03 to about 0.3% zirconium, the balance substantially aluminum and incidental elements and impurities, said wing member having a longitudinal yield strength of at least 84 ksi and an EXCO exfoliation corrosion resistance of "EC" or better and good fracture toughness.

124. An airplane assembly or subassembly comprising an aluminum alloy wing member, said alloy consisting essentially of about, by weight, 7.6 to about 8.4% zinc, about 1.8 to about 2.2% magnesium, about 2 to about 2.6% copper, about 0.03 to about 0.3% zirconium, the balance substantially aluminum and incidental elements and impurities, said wing member having a longitudinal yield strength of at least 84 ksi together with good fracture toughness or good corrosion resistance, or both.

125. The product of claim 10 which is a forging having a yield strength at least 5% higher than that shown in Table 5 for a forging of similar thickness.

126. The product of claim 10 which is a forging having a yield strength at least 7% higher than that shown in Table 5 for a forging of similar thickness.

127. The product of claim 10 which is a forging having a yield strength at least 10% higher than that shown in Table 5 for a forging of similar thickness.

128. The product of claim 10 which is a forging having a yield strength at least 12% higher than that shown in Table 5 for a forging of similar thickness.

129. The product of claim 10 which is a forging having a yield strength at least 15% higher than that shown in Table 5 for a forging of similar thickness.

130. The extruded product according to claim 113 having a yield strength of 89 ksi or more in both compression and tension.

131. The extruded product according to claim 113 having a yield strength of 90 ksi or more in both compression and tension.

132. In an airplane, as assembly or subassembly comprising a member comprising an aluminum alloy, said alloy consisting essentially of about, by weight 7.6 to about 8.4% zinc, about 1.8 to about 2.1% magnesium and about 2.2 to about 2.6% copper, about 0.03 to about 0.3% zirconium, the balance substantially aluminum and incidental elements and impurities.

133. The allow product of claim 10 which is a sheet or plate product and has a minimum longitudinal yield strength of at least 83 ksi and a short transverse stress corrosion resistance such that a 20-day alternate immersion test can be passed at a stress of 12 ksi.

134. The allow product of claim 10 which is a sheet or plate product and has a minimum longitudinal yield strength of at least 83 ksi and a short transverse stress corrosion resistance such that a 20-day alternate immersion test can be passed at a stress of 13 ksi.

135. The allow product of claim 10 which is a sheet or plate product and has a minimum longitudinal yield strength of at least 84 ksi and a short transverse stress corrosion resistance such that a 20-day alternate immersion test can be passed at a stress of 15 ksi.

136. The allow product of claim 10 which is a sheet or plate product and has a minimum longitudinal yield strength of at least 83 ksi and a short transverse stress corrosion resistance such that a 20-day alternate immersion test can be passed at a stress of 14 ksi and has an L-T fracture toughness, $K_{app}$, of 60 ksi $\sqrt{in}$ or more.

137. The allow product of claim 10 which is a sheet or plate product and has a minimum longitudinal yield strength of at least 83 ksi and a short transverse stress corrosion resistance such that a 20-day alternate immersion test can be passed at a stress of 13 ksi and has an L-T fracture toughness, $K_{app}$, of 65 ksi $\sqrt{in}$ or more.

138. The allow product of claim 10 which is a sheet or plate product and has a minimum longitudinal yield strength of at least 83 ksi and a short transverse stress corrosion resistance such that a 20-day alternate immersion test can be passed at a stress of 13 ksi and has an L-T fracture toughness, $K_{app}$, of 70 ksi $\sqrt{in}$ or more.

139. The allow product of claim 10 which is a sheet or plate product and has a minimum longitudinal yield strength of at least 84 ksi and a short transverse stress corrosion resistance such that a 20-day alternate immersion test can be passed at a stress of 15 ksi and has an L-T fracture toughness, $K_{app}$, of 70 ksi $\sqrt{in}$ or more.

140. The allow product of claim 10 which is a sheet or plate product and has a minimum longitudinal yield strength of at least 84 ksi and a short transverse stress corrosion resistance such that a 20-day alternate immersion test can be passed at a stress of 15 ksi and has an L-T fracture toughness, $K_{app}$, of 60 ksi $\sqrt{in}$ or more.

141. The allow product of claim 10 which is a plate product and has a minimum longitudinal yield strength of at least 83 ksi and a short transverse stress corrosion resistance such that a 20-day alternate immersion test can be passed at a stress of 13 ksi and has an L-T fracture toughness, $K_{Ic}$, of 20 or more.

142. The allow product of claim 10 which is a plate product and has a minimum longitudinal yield strength of at least 83 ksi and a short transverse stress corrosion resistance such that a 20-day alternate immersion test can be passed at a stress of 13 ksi and has an L-T fracture toughness, $K_{Ic}$, of 21 or more.

143. The allow product of claim 10 which is a plate product and has a minimum longitudinal yield strength of at least 83 ksi and a short transverse stress corrosion resistance such that a 20-day alternate immersion test can be passed at a stress of 13 ksi and has an L-T fracture toughness, $K_{Ic}$, of 22 or more.

144. The allow product of claim 10 which is a plate product and has a minimum longitudinal yield strength of at least 84 ksi and a short transverse stress corrosion resistance such that a 20-day alternate immersion test can be passed at a stress of 15 ksi and has an L-T fracture toughness, $K_{Ic}$, of 22 or more.

145. The alloy product according to claim 10 which is extruded and has a minimum longitudinal yield strength of at least 89 ksi and a short transverse stress corrosion resistance such that a 20-day alternate immersion test can be passed at a stress of 12 ksi.

146. The alloy product according to claim 10 which is extruded and has a minimum longitudinal yield strength of at least 89 ksi and a short transverse stress corrosion resistance such that a 20-day alternate immersion test can be passed at a stress of 13 ksi.

147. The alloy product according to claim 10 which is extruded and has a minimum longitudinal yield strength of at least 89 ksi and a short transverse stress corrosion resistance such that a 20-day alternate immersion test can be passed at a stress of 15 ksi.

148. The alloy product according to claim 10 which is extruded and has a minimum longitudinal yield strength of at least 89 ksi and a short transverse stress corrosion resistance such that a 20-day alternate immersion test can be passed at a stress of 13 ksi and has an L-T fracture toughness, $K_{Ic}$, of at least 18 ksi $\sqrt{in}$.

149. The alloy product according to claim 10 which is extruded and has a minimum longitudinal yield strength of at least 89 ksi and a short transverse stress corrosion resistance such that a 20-day alternate immersion test can be passed at a stress of 14 ksi and has an L-T fracture toughness, $K_{Ic}$, of at least 18 ksi $\sqrt{in}$.

150. The alloy product according to claim 10 which is extruded and has a minimum longitudinal yield strength of at least 90 ksi and a short transverse stress corrosion resistance such that a 20-day alternate immersion test can be passed at a stress of 15 ksi and has an L-T fracture toughness, $K_{Ic}$, of at least 19 ksi $\sqrt{in}$.

151. The alloy product according to claim 10 which is extruded and has a minimum longitudinal compressive yield strength of at least 91 ksi and a short transverse stress corrosion resistance such that a 20-day alternate immersion test can be passed at a stress of 14 ksi and has an L-T fracture toughness, $K_{Ic}$, of at least 18 ksi $\sqrt{in}$.

152. The alloy product according to claim 10 which is extruded and has a minimum longitudinal compressive yield strength of at least 91 ksi and a short transverse stress corrosion resistance such that a 20-day alternate immersion test can be passed at a stress of 15 ksi and has an L-T fracture toughness, $K_{Ic}$, of at least 19 ksi $\sqrt{in}$.

153. The alloy product according to claim 10 which is extruded and has a minimum longitudinal yield strength of at least 89 ksi and a short transverse stress corrosion resistance such that a 20-day alternate immersion test can be passed at a stress of 13 ksi and has an L-T fracture toughness sufficient to exhibit a net area residual strength of at least 40 ksi in a four-inch center crack panel test or the substantial equivalent thereof.

154. The alloy product according to claim 10 which is extruded and has a minimum longitudinal yield strength of at least 89 ksi and a short transverse stress corrosion resistance such that a 20-day alternate immersion test can be passed at a stress of 15 ksi and has an L-T fracture toughness sufficient to exhibit a net area residual strength of at least 43 ksi in a four-inch center crack panel test or the substantial equivalent thereof.

155. The alloy product according to claim 10 which is extruded and has a minimum longitudinal yield strength of at least 89 ksi and a short transverse stress corrosion resistance such that a 20-day alternate immersion test can be passed at a stress of 15 ksi and has an L-T fracture toughness sufficient to exhibit a net area residual strength of at least 40 ksi in a four-inch center crack panel test or the substantial equivalent thereof.

156. The alloy product according to claim 10 which is extruded and has a minimum longitudinal yield strength of at least 90 ksi and a short transverse stress corrosion resistance such that a 20-day alternate immersion test can be passed at a stress of 15 ksi and has an L-T fracture toughness sufficient to exhibit a net area residual strength of at least 43 ksi in a four-inch center crack panel test or the substantial equivalent thereof.

157. The alloy product according to claim 10 which is extruded and has a minimum longitudinal yield strength of at least 90 ksi and a short transverse stress corrosion resistance such that a 20-day alternate immersion test can be passed at a stress of 15 ksi and has an L-T fracture toughness sufficient to exhibit a net area residual strength of at least 45 ksi in a four-inch center crack panel test or the substantial equivalent thereof.

158. The product of claim 10 which is extruded and has a longitudinal yield strength exceeding 92 ksi and has an L-T fracture toughness, $K_{Ic}$, exceeding 17 ksi $\sqrt{in}$.

159. The product of claim 10 which is extruded and has a longitudinal yield strength exceeding 91 ksi and has an L-T fracture toughness, $K_{Ic}$, exceeding 18 ksi $\sqrt{in}$.

160. The product according to claim 10 that has been solution heat treated and then artificially aged including:
 (a) heating with 175° to 300° F. for a cumulative time of 2 hours or more, and subsequently
 (b) heating above 320° F.

161. The product according to claim 160 that is age formed.

162. The product according to claim 160 that is a forging.

163. The product according to claim 160 whose production includes age forming subsequent to said heating above 320° F.

164. The product according to claim 10 that is age formed.

165. A product according to claim 10 which is a forging having better toughness than a 7050 forging of similar thickness and strength.

166. A product according to claim 10 which is a forging.

167. A product according to claim 10 which is a forging having good toughness.

* * * * *

UNITED STATES PATENT AND TRADEMARK OFFICE
CERTIFICATE OF CORRECTION

PATENT NO. : 5,221,377

DATED : June 22, 1993

INVENTOR(S) : Warren H. Hunt, Jr. et al

It is certified that error appears in the above-identified patent and that said Letters Patent is hereby corrected as shown below:

On the Title Page:

References Cited    Add the following references:
U.S. Patent Documents:

| Number | Date | Name |
|---|---|---|
| 2,248,185 | 7-8-41 | Nock |
| 3,198,676 | 8-3-65 | Sprowls et al |
| 3,231,435 | 1-25-66 | Rotsell et al |
| 3,287,185 | 11-22-66 | Vachet et al |
| 3,305,410 | 2-21-67 | Sublett et al |
| 3,563,814 | 2-16-71 | Lyle et al |
| 3,645,804 | 2-29-72 | Ponchel |
| 3,791,876 | 2-12-74 | Kroger |
| 3,836,405 | 9-17-74 | Staley et al |
| 3,856,584 | 12-24-74 | Cina |
| 3,881,966 | 5-6-75 | Staley et al |
| 3,945,861 | 3-23-76 | Anderson et al |
| 3,947,297 | 3-30-76 | Reimann et al |
| 4,063,936 | 12-20-77 | Nagase et al |
| 4,069,072 | 1-17-78 | Develay et al |
| 4,126,448 | 11-21-78 | Moore et al |
| 4,189,334 | 2-19-80 | Dubost et al |
| 4,193,822 | 3-18-80 | Adam et al |
| 4,200,476 | 4-29-80 | Dubost et al |
| 4,305,763 | 12-15-81 | Quist et al |
| 4,345,951 | 8-24-82 | Coupry et al |
| 4,431,467 | 2-14-84 | Staley et al |
| 4,477,292 | 10-16-84 | Brown |
| 4,629,517 | 12-16-86 | Lifka et al |
| 4,732,610 | 3-22-88 | Hildeman et al |
| 4,828,631 | 5-9-89 | Ponchel et al |
| 4,832,758 | 5-23-89 | Brown |
| 4,954,188 | 9-4-90 | Ponchel et al |

UNITED STATES PATENT AND TRADEMARK OFFICE
CERTIFICATE OF CORRECTION

PATENT NO. : 5,221,377

DATED : June 22, 1993

INVENTOR(S) : Warren H. Hunt, Jr et al

It is certified that error appears in the above-identified patent and that said Letters Patent is hereby corrected as shown below:

On the Title Page:

References Cited (Cont'd.)

Add the following references:

Foreign Patent Documents:

| Number | Date | Country |
|---|---|---|
| 1,476,942 | 6-16-77 | British |
| 1,480,351 | 7-20-77 | British |
| 1,206,354 | 6-24-86 | Canada |
| 58,061,246 | 4-12-83 | Japan |
| 58,113,342 | 7-6-83 | Japan |
| 60,013,047 | 1-23-85 | Japan |
| 60,180,637 | 9-14-85 | Japan |
| 61,238,937 | 10-24-86 | Japan |
| 61,259,828 | 11-18-86 | Japan |
| 62,063,641 | 3-30-87 | Japan |
| 62,142,753 | 6-26-87 | Japan |
| 473,759 | 10-1-75 | USSR |
| 2,314,183 | 10-3-74 | German |
| 2,518,579 | 12-23-82 | French |
| 429,198 | 7-31-67 | Switzerland |

Other Documents:

"Precipitation Hardening and Stress Corrosion in AlZnMg$_3$,", W. Gruhl et al, *Z. Metallkunde*, Vol. 55, No. 10, pp. 577-582 (1964)

"Thermomechanical Treatments on High Strength Al-Zn-Mg(-Cu) Alloys", E. DiRusso et al, *Metallurgical Transactions*, Vol. 4, pp. 1133-1144 (April 1973)

UNITED STATES PATENT AND TRADEMARK OFFICE
CERTIFICATE OF CORRECTION

PATENT NO.  : 5,221,377

DATED       : June 22, 1993

INVENTOR(S) : Warren H. Hunt, Jr. et al

It is certified that error appears in the above-identified patent and that said Letters Patent is hereby corrected as shown below:

On the Title Page:

References Cited (Cont'd.)

Add the following references:
Other Documents (cont'd.):
"New Technique for Reducing Susceptibility to Stress-Corrosion of High Strength Aluminum Alloys", B. Cina et al, Published by the Pittsburgh Chapter of the American Society for Metals (1974)

"A New Approach to the Problem of Stress Corrosion Cracking in 7076-T6 Aluminum", W. Wallace et al, Canadian Aeronautics and Space Journal, Vol. 27, No. 3, pp. 222-232 (1981)

"Microstructural Study of a High-Strength Stress Corrosion Resistant 7075 Aluminum Alloy", K. Rajan et al, Journal of Materials Science, Vol. 17, pp. 2817-2824 (1982)

"Retrogression and reaging response of 7475 aluminum alloy", M. U. Islam et al, Metals Technology, Vol. 10, pp. 386-392 (October 1983)

Report: "Investigation to Improve the Stress-Corrosion Resistance of Aluminum Aircraft Alloys Through Alloy Additions and Specialized Heat Treatment", J. T. Staley, under Navair N00019-68-C-0146 (Navair Report)

UNITED STATES PATENT AND TRADEMARK OFFICE
CERTIFICATE OF CORRECTION

PATENT NO. : 5,221,377

DATED : June 22, 1993

INVENTOR(S) : Warren H. Hunt, Jr. et al

It is certified that error appears in the above-identified patent and that said Letters Patent is hereby corrected as shown below:

On the Title Page:

| | |
|---|---|
| First page, after "Attorney, Agent, or Firm" | Change "Cary P. Topolosky" to --Gary P. Topolosky-- |
| Col. 11, line 57 | Before the words "(black square)", insert --■-- |
| Col. 11, line 59 | Before the words "(black triangle)", insert --▲-- |
| Col. 11, line 60 | Before the words "(black circle)", insert --●-- |
| Col. 13, line 65 | Before the words "(black square)", insert --■-- |
| Col. 13, line 67 | Before the words "(black diamond)", insert --◆-- |
| Col. 14, line 1 | Before the words "(black circle)", insert --●-- |
| Col. 14, line 3 | Before the words "(black triangle)", insert --▲-- |
| Col. 28, line 60, Claim 116 | Change "88 ksi" to --89 ksi-- |
| Col. 30, line 26, Claim 133 | Change "allow" to --alloy-- |
| Col. 30, line 31, Claim 134 | Change "allow" to --alloy-- |

UNITED STATES PATENT AND TRADEMARK OFFICE
CERTIFICATE OF CORRECTION

PATENT NO. : 5,221,377

DATED : June 22, 1993

INVENTOR(S) : Warren H. Hunt, Jr. et al

It is certified that error appears in the above-identified patent and that said Letters Patent is hereby corrected as shown below:

On the Title Page:

| | |
|---|---|
| Col. 30, line 36, Claim 135 | Change "allow" to --alloy-- |
| Col. 30, line 41, Claim 136 | Change "allow" to --alloy-- |
| Col. 30, line 47, Claim 137 | Change "allow" to --alloy-- |
| Col. 30, line 53, Claim 138 | Change "allow" to --alloy-- |
| Col. 30, line 57, Claim 139 | Change "allow" to --alloy-- |
| Col. 30, line 65, Claim 140 | Change "allow" to --alloy-- |
| Col. 31, line 3, Claim 141 | Change "allow" to --alloy-- |
| Col. 31, line 9, Claim 142 | Change "allow" to --alloy-- |
| Col. 31, line 15, Claim 143 | Change "allow" to --alloy-- |
| Col. 31, line 21, Claim 144 | Change "allow" to --alloy-- |

Signed and Sealed this

Fourth Day of October, 1994

Attest:

BRUCE LEHMAN

*Attesting Officer*   *Commissioner of Patents and Trademarks*